(12) United States Patent
Sim et al.

(10) Patent No.: US 11,599,152 B2
(45) Date of Patent: Mar. 7, 2023

(54) ELECTRONIC DEVICE HAVING BENDED DISPLAY AND METHOD FOR CONTROLLING THE SAME

(71) Applicant: Samsung Electronics Co., Ltd., Suwon-si (KR)

(72) Inventors: Hyunwoo Sim, Suwon-si (KR); Yonghwa Kim, Hwaseong-si (KR); Junghoon Park, Incheon (KR); Jungchul An, Yongin-si (KR); Seungbum Choi, Suwon-si (KR); Dongil Son, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/003,725

(22) Filed: Aug. 26, 2020

(65) Prior Publication Data

US 2020/0393870 A1    Dec. 17, 2020

Related U.S. Application Data

(63) Continuation of application No. 15/809,936, filed on Nov. 10, 2017, now abandoned.

(30) Foreign Application Priority Data

Dec. 8, 2016   (KR) .......................... 10-2016-0166941

(51) Int. Cl.
| | |
|---|---|
| *G06F 1/16* | (2006.01) |
| *H04M 1/02* | (2006.01) |
| *G09G 5/14* | (2006.01) |

(52) U.S. Cl.
CPC ............ *G06F 1/165* (2013.01); *G06F 1/1626* (2013.01); *G06F 1/1647* (2013.01);
(Continued)

(58) Field of Classification Search
CPC ...... G06F 1/165; G06F 1/1626; G06F 1/1647; G06F 1/1652; G06F 2200/1614;
(Continued)

(56) References Cited

U.S. PATENT DOCUMENTS

| | | |
|---|---|---|
| 8,723,824 B2 | 5/2014 | Myers et al. |
| 9,367,095 B2 | 6/2016 | Myers |

(Continued)

FOREIGN PATENT DOCUMENTS

| | | |
|---|---|---|
| EP | 2993571 A1 | 3/2016 |
| KR | 10-2013-0027335 A | 3/2013 |

(Continued)

OTHER PUBLICATIONS

European Search Report dated Dec. 22, 2020 in connection with European Patent Application No. 20 19 4395, 11 pages.

(Continued)

*Primary Examiner* — Premal R Patel

(57) ABSTRACT

An electronic device having a bended display and a method for controlling the same. The electronic device includes a front display area and at least two separate side display areas that are physically connected with at least one side of the front display area and form a convex curved surface in at least one space between the front and the rear of the electronic device. The electronic device also includes and a non-display area that physically connects at least two side display areas of the at least two separate side display areas and forms a convex double curvature surface in at least another space between the front and the rear of the electronic device. The at least two physically connected side display areas may be bent in directions so that an acute angle, a right angle or an obtuse angle is formed.

16 Claims, 24 Drawing Sheets

(52) U.S. Cl.
CPC ............ *G06F 1/1652* (2013.01); *G09G 5/14* (2013.01); *H04M 1/0268* (2013.01); *G06F 2200/1614* (2013.01); *G09G 2340/0492* (2013.01); *G09G 2354/00* (2013.01); *G09G 2360/04* (2013.01); *H04M 2250/16* (2013.01)

(58) Field of Classification Search
CPC .. G06F 1/1643; G06F 1/1656; H04M 1/0268; H04M 2250/16; H04M 1/026; G09G 5/14; G09G 2340/0492; G09G 2354/00; G09G 2360/04
See application file for complete search history.

(56) References Cited

U.S. PATENT DOCUMENTS

| | | | |
|---|---|---|---|
| 2008/0130921 A1 | 6/2008 | Tokuhisa et al. | |
| 2011/0216064 A1* | 9/2011 | Dahl | G06F 1/1677 345/428 |
| 2012/0148081 A1* | 6/2012 | Yeates | H04R 17/00 381/345 |
| 2012/0324400 A1* | 12/2012 | Caliendo, Jr. | G06F 3/0481 715/835 |
| 2013/0076612 A1* | 3/2013 | Myers | G06F 3/013 345/156 |
| 2013/0081756 A1 | 4/2013 | Franklin et al. | |
| 2013/0241921 A1 | 9/2013 | Kurtenbach et al. | |
| 2014/0098095 A1 | 4/2014 | Lee et al. | |
| 2014/0118271 A1* | 5/2014 | Lee | G06F 3/3265 345/173 |
| 2014/0247405 A1 | 9/2014 | Jin et al. | |
| 2014/0289668 A1* | 9/2014 | Mavrody | G06F 1/1643 715/781 |
| 2015/0138041 A1* | 5/2015 | Hirakata | H01L 51/0097 345/1.3 |
| 2015/0146069 A1 | 5/2015 | Yamazaki et al. | |
| 2015/0169089 A1* | 6/2015 | Dixon | B32B 38/0004 428/137 |
| 2015/0261376 A1 | 9/2015 | Kim et al. | |
| 2015/0280771 A1* | 10/2015 | Mow | H01Q 1/243 455/77 |
| 2016/0066440 A1 | 3/2016 | Choi et al. | |
| 2016/0234362 A1 | 8/2016 | Moon et al. | |
| 2016/0261025 A1 | 9/2016 | Lung et al. | |
| 2016/0266774 A1 | 9/2016 | Kim et al. | |
| 2016/0306392 A1 | 10/2016 | Park | |
| 2016/0309263 A1* | 10/2016 | Kanemaki | G06F 1/1688 |
| 2016/0320966 A1 | 11/2016 | Ryu et al. | |

FOREIGN PATENT DOCUMENTS

| | | |
|---|---|---|
| KR | 10-2014-0066253 A | 5/2014 |
| KR | 10-2016-0097106 A | 8/2016 |

OTHER PUBLICATIONS

Extended European Search Report for European Patent Application No. 17201999.4 dated Apr. 25, 2018; 11 pages.
Summons to attend oral proceedings pursuant to Rule 115(1) EPC dated Nov. 11, 2019 in connection with European Patent Application No. 17 201 999.4, 8 pages.
Communication pursuant to Article 94(3) EPC dated Aug. 25, 2021, in connection with European Application No. 20194395.8, 9 pages.
European Patent Office, "Summons to attend oral proceedings pursuant to Rule 115(1) EPC" issued Mar. 21, 2022, in connection with European Patent Application No. 20194395.8, 9 pages.

\* cited by examiner (a)   (b)

ELECTRONIC DEVICE HAVING BENDED DISPLAY AND METHOD FOR CONTROLLING THE SAME

CROSS-REFERENCE TO RELATED APPLICATIONS

The present application is a continuation of U.S. patent application Ser. No. 15/809,936 filed on Nov. 10, 2017, which is based on and claims priority under 35 U.S.C. § 119 to Korean Patent Application No. 10-2016-0166941 filed on Dec. 8, 2016, the disclosures of which are herein incorporated by reference in their entirety.

BACKGROUND

1. Field

The present disclosure relates to an electronic device having a bended display and a control method therefor. More particularly, the present disclosure relates to an electronic device including a front display area and at least two separate side display areas, and a control method therefor.

2. Description of Related Art

Recent advances in digital technologies have enabled development of various types of electronic devices that enable users on the move to communicate and process personal information, such as mobile communication terminals, personal digital assistants (PDA), electronic schedulers, smartphones, and tablet personal computers. Electronic devices have evolved into mobile convergence devices supporting heterogeneous functions having originated from distinct fields. For example, such an electronic device may support various functions related to voice or video calls, text or multimedia messages, electronic organizers, image capture, electronic mail, broadcast reception, video playback, Internet access, electronic commerce, music playback, schedule management, social networking services (SNS), friend finder services, messengers, and dictionaries.

As electronic devices support diverse functions, various types of information are simultaneously generated. To visually represent such electrical information signals, display technologies are rapidly developing.

In recent years, there have been introduced flexible panels that use flexible substrates made of flexible materials such as plastic and are capable of maintaining display performance even when bent like a sheet of paper.

Such a flexible panel may be used to form a bended display, so that the outer edge area of an electronic device (i.e. bezel area) can be reduced and the display area can be relatively widened. This may raise the value of the product due to esthetics and utility.

A double curvature surface may be formed at the connection portion connecting separate bended displays bent in different directions. For example, the connection portion connecting a bended display bent toward the top side of the electronic device and a bended display bent toward the right side thereof may have a double curvature surface of negative Gaussian curvature given by the product of two principal curvatures.

SUMMARY

To address the above-discussed deficiencies, it is a primary object to provide a method of implementing an electronic device having a double curvature surface by using a single flexible panel.

In accordance with an aspect of the present invention, there is provided an electronic device. The electronic device may include: a front display area; at least two separate side display areas that are physically connected with at least one side of the front display area and form a convex curved surface in at least one space between the front and the rear of the electronic device; and a non-display area that physically connects at least two side display areas among the at least two separate side display areas and forms a convex double curvature surface in at least another space between the front and the rear of the electronic device, wherein the at least two physically connected side display areas are bent in directions so that an acute angle, a right angle or an obtuse angle is formed.

In accordance with another aspect of the present invention, there is provided an electronic device. The electronic device may include: a display; and at least one display driver chip (DDI) to drive the display. The display may include: a transparent window enclosing the front and at least a portion of the lateral side of the electronic device; a three-dimensional film having a shape corresponding to the shape of the transparent window; and a flexible panel including a front display area and at least two separate side display areas. At least two side display areas among the at least two separate side display areas may be bent in directions so that an acute angle, a right angle or an obtuse angle is formed.

In accordance with another aspect of the present invention, there is provided a method for an electronic device including a front display area and at least two separate side display areas to control the display areas. The method may include: receiving an input for setting a display mode; and controlling each display area to display specific content according to the display mode set by the received input.

In a feature of the present invention, there is provided an electronic device that's all or at least a portion of the outer edge region is implemented as a bended display.

In addition, the electronic device may provide various user interfaces by utilizing at least a portion of a bended display installed at the outer edge region of the display area.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
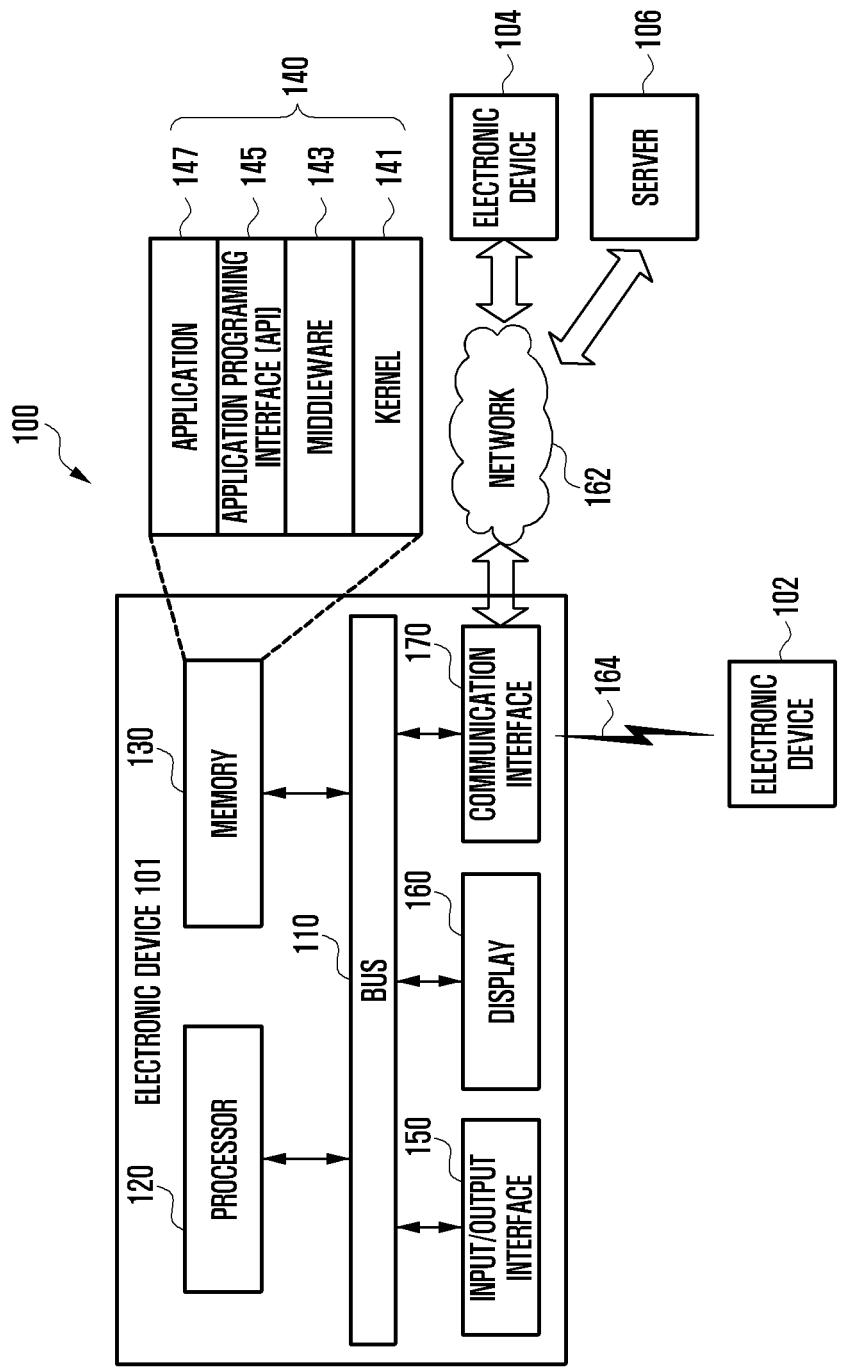
FIG. 1 illustrates a network environment including electronic devices according to various embodiments of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present specification will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, an electronic tattoo, a smart mirror, or a smart watch).

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR) , a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.)

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

Referring to FIG. 1, an electronic device 101, in a network environment 100, includes a bus 110, a processor 120, a memory 130, an input/output interface 150, a display 160, and a communication interface 170. According to some embodiment, the electronic device 101 may omit at least one of the components or further include another component.

The bus 110 may be a circuit connecting the above described components and transmitting communication (e.g., a control message) between the above described components.

The processor 120 may include one or more of central processing unit (CPU), application processor (AP) or communication processor (CP). For example, the processor 120 may control at least one component of the electronic device 101 and/or execute calculation relating to communication or data processing.

The memory 130 may include volatile and/or non-volatile memory. For example, the memory 130 may store command or data relating to at least one component of the electronic device 101. According to some embodiment, the memory may store software and/or program 140. For example, the program 140 may include a kernel 141, middleware 143, an application programming interface (API) 145, and/or an application 147 and so on. At least one portion of the kernel 141, the middleware 143 and the API 145 may be defined as operating system (OS).

The kernel 141 controls or manages system resources (e.g., the bus 110, the processor 120, or the memory 130) used for executing an operation or function implemented by the remaining other program, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 may be used, to the application 147.

The API 145 is an interface by which the application 147 may control a function provided by the kernel 141 or the middleware 142 and includes, for example, at least one interface or function (e.g., command) for a file control, a window control, image processing, or a character control.

The input/output interface 150 may be interface to transmit command or data inputted by a user or another external device to another component(s) of the electronic device 101. Further, the input/output interface 150 may output the command or data received from the another component(s) of the electronic device 101 to the user or the another external device.

The display 160 may include, for example, liquid crystal display (LCD), light emitting diode (LED), organic LED (OLED), or micro electro mechanical system (MEMS) display, or electronic paper display. The display 160 may display, for example, various contents (text, image, video, icon, or symbol, and so on) to a user. The display 160 may include a touch screen, and receive touch, gesture, approaching, or hovering input using a part of body of the user.

The communication interface 170 may set communication of the electronic device 101 and external device (e.g., a first external device 102, a second external device 104, or a server 106). For example, the communication interface 170 may be connected with the network 162 through wireless communication or wire communication and communicate with the external device (e.g., a second external device 104 or server 106).

Wireless communication may use, as cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), GSM (Global System for Mobile Communications), and the like, for example. A short-range communication 164 may include, for example, at least one of Wi-Fi, Bluetooth, Near Field Communication (NFC), and Global Navigation Satellite System (GNSS), and the like.

The GNSS may include at least one of, for example, a Global Positioning System (GPS), a Global navigation satellite system (GLONASS), a Beidou Navigation Satellite System (hereinafter, referred to as "BEIDOU"), and GALILEO (European global satellite-based navigation system). Hereinafter, the "GPS" may be interchangeably used with the "GNSS" in the present disclosure. Wired communication may include, for example, at least one of USB (universal serial bus), HDMI (high definition multimedia interface), RS-232 (recommended standard-232), POTS (plain old telephone service), and the like. The network 162 may include telecommunication network, for example, at least one of a computer network (e.g., LAN or WAN), internet, and a telephone network.

Each of the first external device 102 and the second external device 104 may be same type or different type of device with the electronic device 101. According to some embodiment, the server 106 may include one or more group of servers. According to various embodiments, at least one portion of executions executed by the electronic device may be performed by one or more electronic devices (e.g., external electronic device 102, 104, or server 106). According to some embodiments, when the electronic device 101 should perform a function or service automatically, the electronic device 101 may request performing of at least one function to the another device (e.g., external electronic device 102, 104, or server 106). For the above, cloud computing technology, distributed computing technology, or client-server computing technology may be used, for example.

Figure 2:
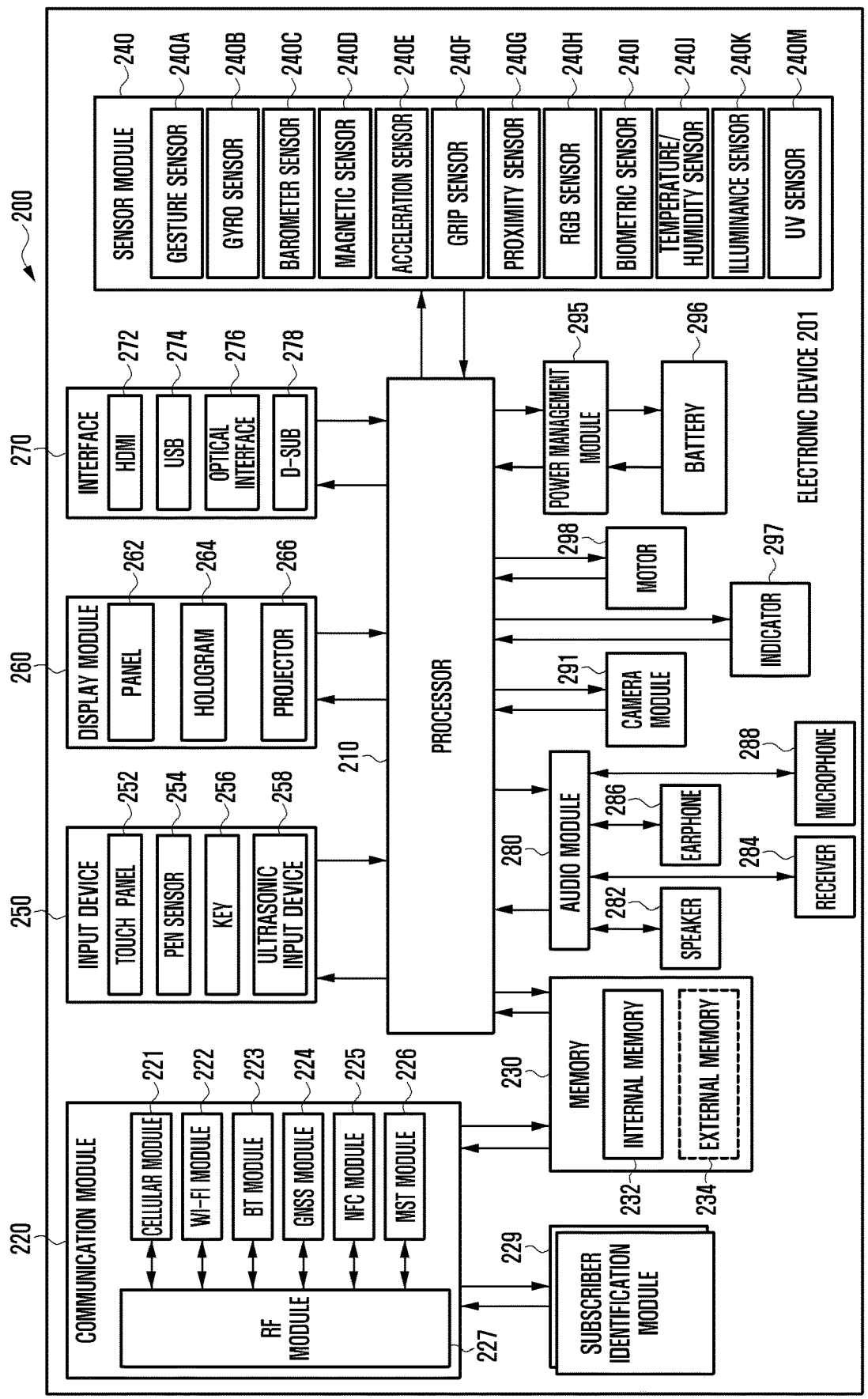
FIG. 2 illustrates a block diagram of an electronic device according to various embodiments of the present disclosure.

FIG. 2 illustrates a block diagram of an electronic device according to an embodiment of the present disclosure.

Referring to FIG. 2, an electronic device 201 may configure, for example, a whole or a part of the electronic device 101 illustrated in FIG. 1. The electronic device 201 includes one or more APs 210, a communication module 220, a subscriber identification module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an OS or an application program so as to control a plurality of hardware or software component elements connected to the AP 210 and execute various data processing and calculations including multimedia data. The AP 210 may be implemented by, for example, a system on chip (SoC). According to an embodiment, the processor 210 may further include a graphics processing unit (GPU) and/or image signal processor. The AP 210 may include at least one portion of components illustrated in FIG. 2 (e.g., a cellular module 221). The AP 210 may load command or data received from at least one of another component (e.g., non-volatile memory), store various data in the non-volatile memory.

The communication module 220 may include same or similar components with the communication interface 170 of FIG. 1. The communication module 220, for, example, may include the cellular module 221, a Wi-Fi module 223, a BT module 225, a GPS module 227, a NFC module 228, and a radio frequency (RF) module 229.

The cellular module 221 provides a voice, a call, a video call, a short message service (SMS), or an internet service through a communication network (e.g., LTE, LTE-A, CDMA, WCDMA, UMTS, WiBro, GSM and the like). Further, the cellular module 221 may distinguish and authenticate electronic devices within a communication network by using a SIM (e.g., the SIM card 224). According to an embodiment, the cellular module 221 performs at least some of the functions which may be provided by the AP 210. For example, the cellular module 221 may perform at least some of the multimedia control functions. According to an embodiment, the cellular module 221 may include a CP.

Each of the Wi-Fi module 223, the BT module 225, the GPS module 227, and the NFC module 228 may include, for example, a processor for processing data transmitted/received through the corresponding module. Although the cellular module 221, the Wi-Fi module 223, the BT module 225, the GPS module 227, and the NFC module 228 are at least some (e.g., two or more) of the cellular module 221, the Wi-Fi module 223, the BT module 225, the GPS module 227, and the NFC module 228 may be included in one integrated chip (IC) or one IC package according to one embodiment. For example, at least some (e.g., the CP corresponding to the cellular module 221 and the Wi-Fi processor corresponding to the Wi-Fi module 222 of the processors corresponding to the cellular module 221, the Wi-Fi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a power amp module (PAM), a frequency filter, a low noise amplifier (LNA) and the like. Further, the RF module 229 may further include a component for transmitting/receiving electronic waves over a free air space in wireless communication, for example, a conductor, a conducting wire, and the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to one embodiment.

The SIM card 224 is a card including a SIM and may be inserted into a slot formed in a particular portion of the electronic device. The SIM card 224 includes unique identification information (e.g., integrated circuit card identifier (ICCID)) or subscriber information (e.g., international mobile subscriber identity (IMSI)).

The memory 230 (e.g., memory 130) may include an internal memory 232 or an external memory 234. The internal memory 232 may include, for example, at least one of a volatile memory (e.g., a random access memory (RAM), a dynamic RAM (DRAM), a static RAM (SRAM), a synchronous dynamic RAM (SDRAM), and the like), and a non-volatile Memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like).

According to an embodiment, the internal memory 232 may be a solid state drive (SSD). The external memory 234 may further include a flash drive, for example, a compact flash (CF), a secure digital (SD), a micro-SD, a mini-SD, an extreme digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (e.g., red, green, and blue (RGB) sensor) 240H, a biometric sensor 240I, a temperature/humidity sensor 240J, an illumination (light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an photoplethysmogram (PPG) sensor, an infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which may detect an acoustic wave by a microphone (e.g., a microphone 288) of the electronic device 201 through an input means generating an ultrasonic signal to identify data and may perform wireless recognition. According to an embodiment, the electronic device 201 receives a user input from an external device (e.g., computer or server) connected to the electronic device 201 by using the communication module 220.

The display 260 (e.g., display 160) includes a panel 262, a hologram device 264, and a projector 266. The panel 262 may be, for example, a LCD or an active matrix OLED (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266.

The interface 270 includes, for example, a HDMI 272, an USB 274, an optical interface 276, and a D-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/multi-media card (MMC), or an infra-red data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 and the like.

The camera module 291 is a device which may photograph a still image and a video. According to an embodiment, the camera module 291 may include one or more image sensors (e.g., a front sensor or a back sensor), an image signal processor (ISP) (not shown) or a flash (e.g., an LED or xenon lamp).

The power managing module 295 manages power of the electronic device 201. Although not illustrated, the power managing module 295 may include, for example, a power management integrated circuit (PMIC), a charger IC, or a battery or fuel gauge.

The PMIC may be mounted to, for example, an integrated circuit or a SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery fuel gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 shows particular statuses of the electronic device 201 or a part (e.g., AP 210) of the electronic device 201, for example, a booting status, a message status, a charging status and the like. The motor 298 converts an electrical signal to a mechanical vibration. Although not illustrated, the electronic device 201 may include a processing unit (e.g., GPU) for supporting a module TV. The processing unit for supporting the mobile TV may process, for example, media data according to a standard of digital multimedia broadcasting (DMB), digital video broadcasting (DVB), media flow and the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

FIGS. 3A to 3E illustrate the appearance of an electronic device 300 according to various embodiments.

Figure 3A:
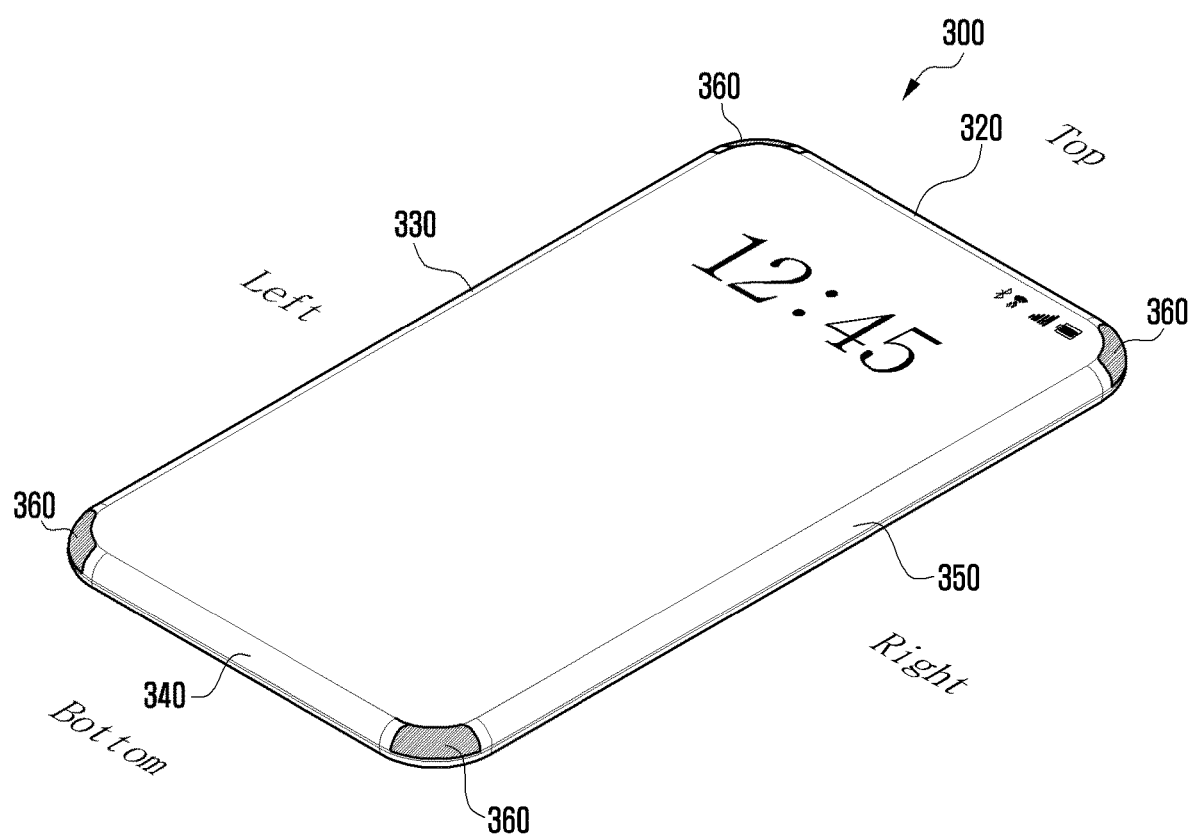
FIGS. 3A to 3E illustrate the appearance of an electronic device according to various embodiments of the present disclosure.

FIG. 3A shows a perspective view of the electronic device 300. In various embodiments, the electronic device 300 may include various electronic components and a housing for protecting them. The housing may include a front side, a rear side facing the front side, and lateral sides (e.g. top side, bottom side, left side, and right side) surrounding the space formed between the front side and the rear side to form the appearance of the electronic device 300. At least a portion of the housing may be composed of a display. For example, the front side and/or lateral sides of the electronic device 300 may be enclosed by displays, or the front side, lateral sides and rear side of the electronic device 300 may be enclosed by displays.

In various embodiments, the display may include a display area and a non-display area. The display area indicates an area of the display for actually displaying an image, and the non-display area 360 indicates an area of the display excluding the display area. The non-display area 360 may be used to mount, for example, various driving circuits, antennas or coils, and external interfaces for connecting to external circuits or external electronic devices. In one embodiment, the non-display area 360 may further include an opaque mechanism for distinguishing it from the display area.

Figure 3B:
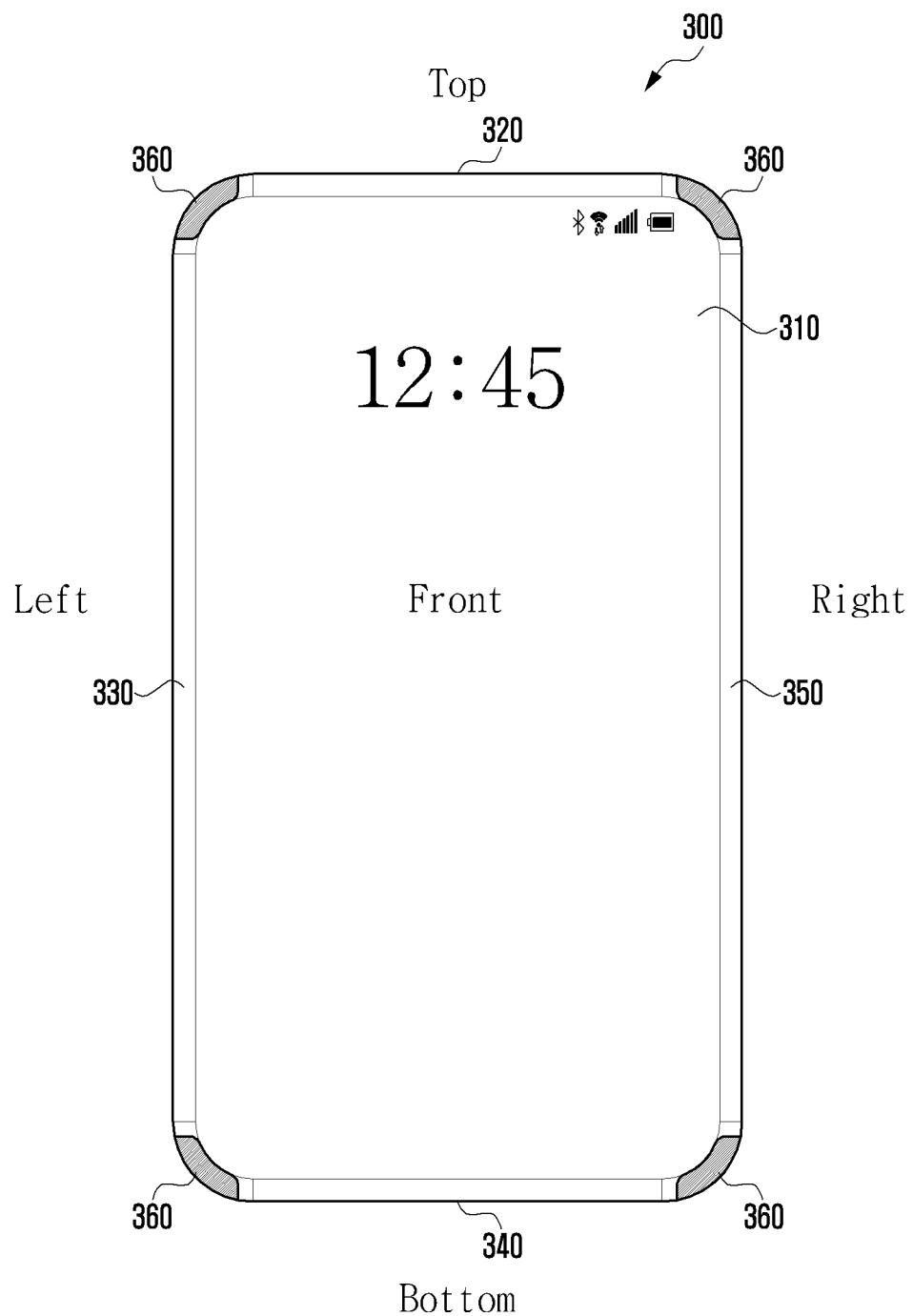

FIG. 3B shows a front view of the electronic device 300. In various embodiments, the front and lateral sides of the electronic device 300 may be enclosed by displays. The lateral sides of the electronic device 300 may be enclosed by bended displays, which are bendable to have a given curvature. For example, when the electronic device 300 is viewed from the front, at least a part of the side display area can be seen as well as the front display area. Although not shown, when the electronic device 300 is viewed from the back, at least a portion of the side display area as well as the rear of the electronic device 300 can be seen due to the curvature of the side display area.

With reference to FIG. 3B, the electronic device 300 may include a front display area 310 having four sides. A bended display may be physically connected to at least one of the four sides of the front display area 310 so as to extend in the lateral direction of the electronic device in a bent form. The bended displays connected respectively to the individual sides may be divided into a top-side display area 320, a bottom-side display area 340, a left-side display area 330, and a right-side display area 350 with respect to the front of the electronic device 300. The side display areas may operate independently and may display different screens. For example, while the front display area 310 displays specific content, at least one side display area may display an icon capable of executing an application. At the same time, another at least one side display area may display a control button for controlling the content displayed in the front display area 310. At the same time, another at least one side display area may display a toolbar for a particular situation. At the same time, another at least one side display area may display a notification for a received message, call or latest news.

Figure 3C:
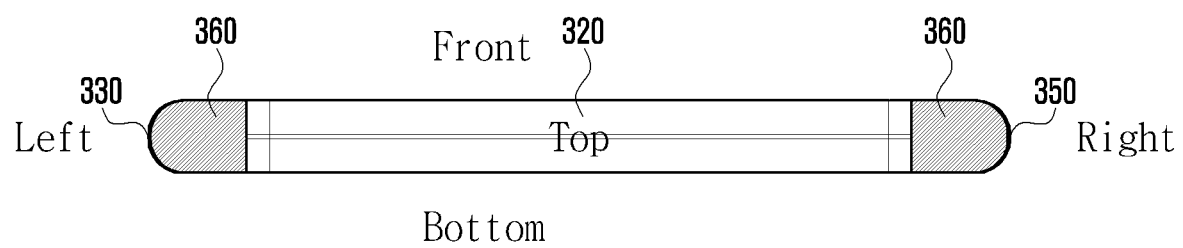
Figure 3D:
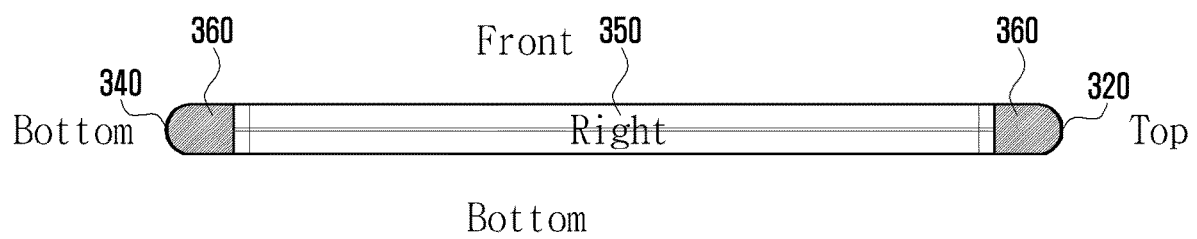

FIGS. 3C and 3D show a side view of the electronic device 300. With reference to FIG. 3C, the top-side display area may be composed of a bended display, which is bendable to have a given curvature. Although the entire top side of the electronic device 300 is shown in FIG. 3C as being covered with the top-side display area, only a part of the top side may be covered with a banded display and the remaining part thereof may be filled with specific mechanisms (the same applies to the bottom-side display).

In various embodiments, the side display areas, which are bent in different directions, may be physically connected through the non-display areas 360. For example, the non-display area 360 between the left-side display area 330 and the top-side display area 320 has a double curvature and is curved in two directions to form a corner portion of the electronic device 300 by physically connecting the two side display areas.

With reference to FIG. 3D, like the top-side display area 320, the right-side display area 350 may be composed of a bended display, which is bendable to have a given curvature. Similarly to the top-side display area 320, the right-side display area 350 may be configured to fully or partially cover the right side of the electronic device 300 (the same applies to the left-side display). That is, some of the side display areas may be configured to fully cover their corresponding sides, and the remaining side display areas may be configured to partially cover their corresponding sides.

Figure 3E:
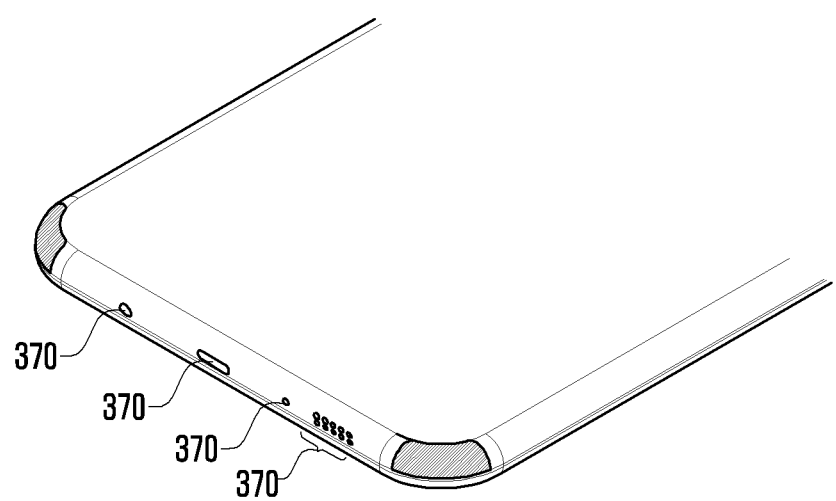

FIG. 3E illustrates a side display area including external interfaces. The external interfaces 370 may be an external path of an electronic component (e.g. speaker (receiver), microphone, camera, or sensor) included in the electronic device, or a path for connecting to an external device. The external interfaces 370 may include, for example, a USB terminal, a microphone hole, a speaker hole, a key button, and an earphone interface. To accommodate the external interface 370, at least a portion of the side display area corresponding to the external interface 370 may be cut. Although FIG. 3E shows only external interfaces 370 included in one side display area, the front display area may also include external interfaces similarly to the side display area.

In various embodiments, the display area including an external interface may operate in the same way as the display area not including an external interface. For example, content can be displayed and a touch can be detected and recognized as an input in the same manner.

Figure 4:
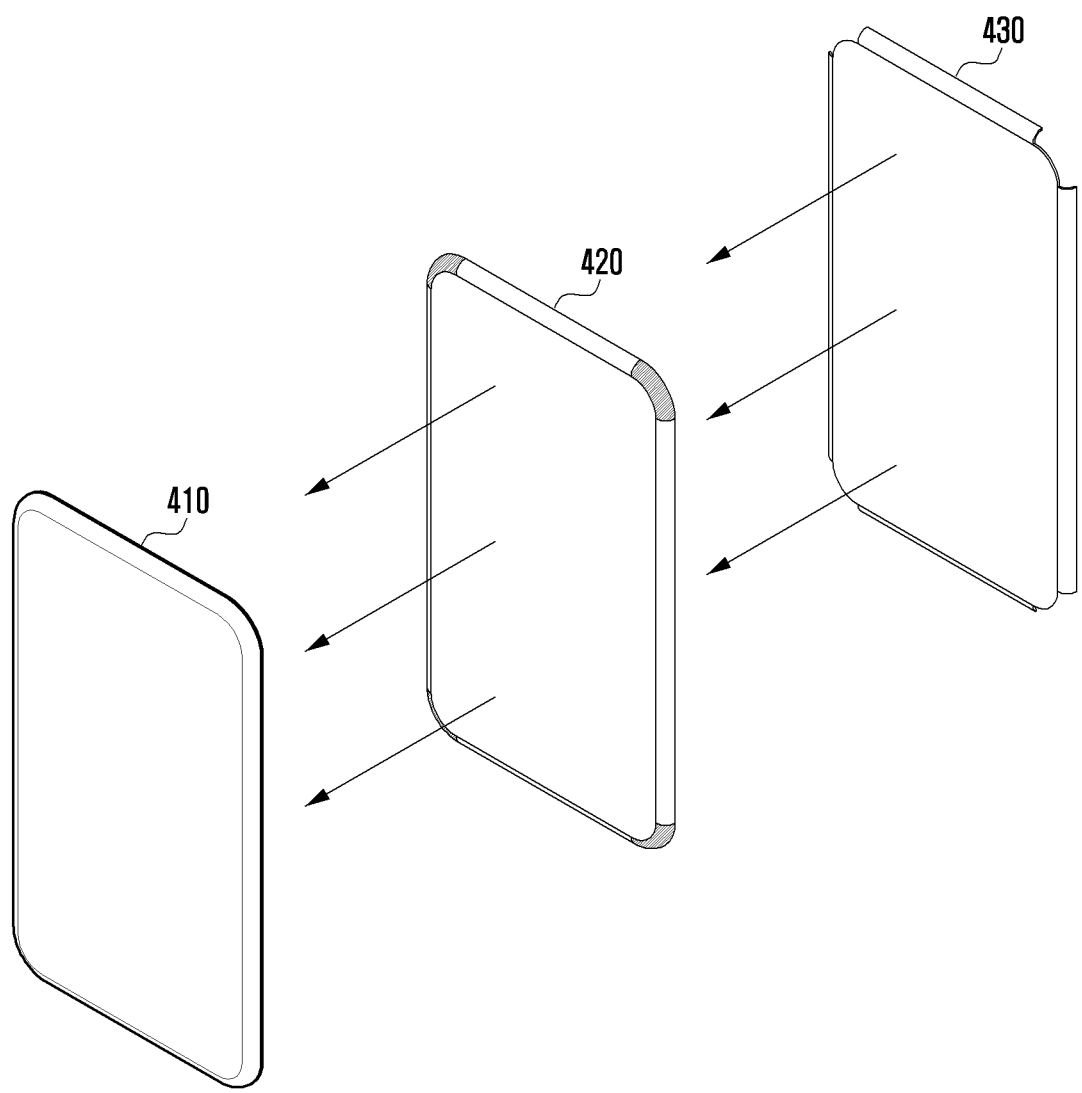
FIG. 4 illustrates the structure of a display according to various embodiments of the present disclosure.

FIG. 4 illustrates the structure of a display according to various embodiments.

In various embodiments, the display may include a transparent window 410, a three-dimensional film 420, and a flexible panel 430.

The transparent window 410 may be configured to enclose, for example, the front and at least some of the lateral sides of the housing of the electronic device. The transparent window 410 may protect electronic components inside the electronic device by dispersing or absorbing the pressure applied from the inside and the outside. The transparent window 410 may be made of a transparent material (e.g. glass or plastic) so that the electrical information signal displayed on the flexible panel 430 can be recognized from the outside.

The three-dimensional film 420 may have a three-dimensional shape corresponding to, for example, the shape of the transparent window 410. The three-dimensional film 420 may be fabricated by molding a flat film into a shape corresponding to the transparent window 410, to which the three-dimensional film 420 will be laminated. The three-dimensional film 420 may be made of a plastic transparent film that is excellent in impact resistance and light in weight. The three-dimensional film 420 may be made of a thermoplastic polymer resin such as polycarbonate (PC), polyimide (PI), polyethersulfone (PES), polyarylate (PAR), polyethylene naphthalate (PEN), polyethylene terephthalate (PET) or cycloolefin copolymer, or a thermosetting polymer resin such as epoxy or unsaturated polyester.

The three-dimensional film 420 may be divided into a display area and a non-display area. For example, the portion of the three-dimensional film 420 corresponding to the flexible panel 430 (e.g. display area) may be substantially transparent, and the portion corresponding to the non-display area may be at least opaque. However, the entire three-dimensional film 420 may be transparent.

The flexible panel 430 may include, for example, a flat display device to maintain a flat shape. The flat display device may include a liquid crystal display device (LCD), plasma display panel device (PDP), field emission display device (FED), electro luminescence display device (ELD), electro-wetting display device (EWD), or organic light emitting display device (OLED). In particular, such a flat display device may include a flexible substrate made of a flexible material such as plastic. The flexible panel 430 may include a front display area and at least two separate side display areas in accordance with the electronic device having a double curvature surface.

Figure 5:
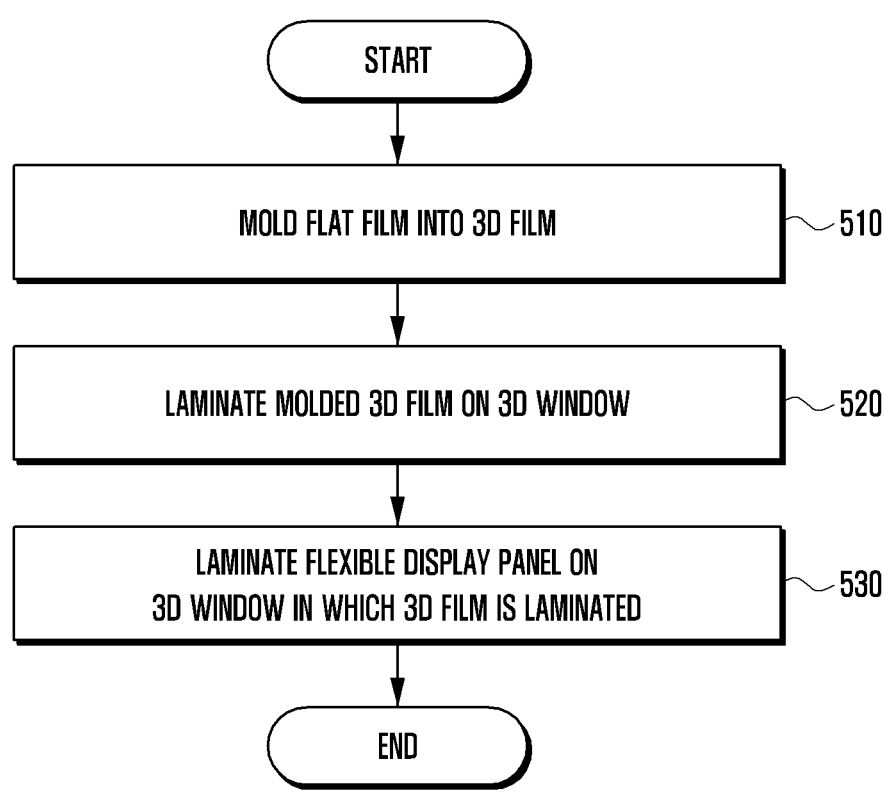
FIG. 5 illustrates a flowchart of a method for manufacturing a display according to various embodiments of the present disclosure.

FIG. 5 is a flowchart of a method for manufacturing a display according to various embodiments.

With reference to FIG. 5, at operation 510, a flat film may be molded into a three-dimensional film in accordance with the shape of the transparent window.

Figure 6:
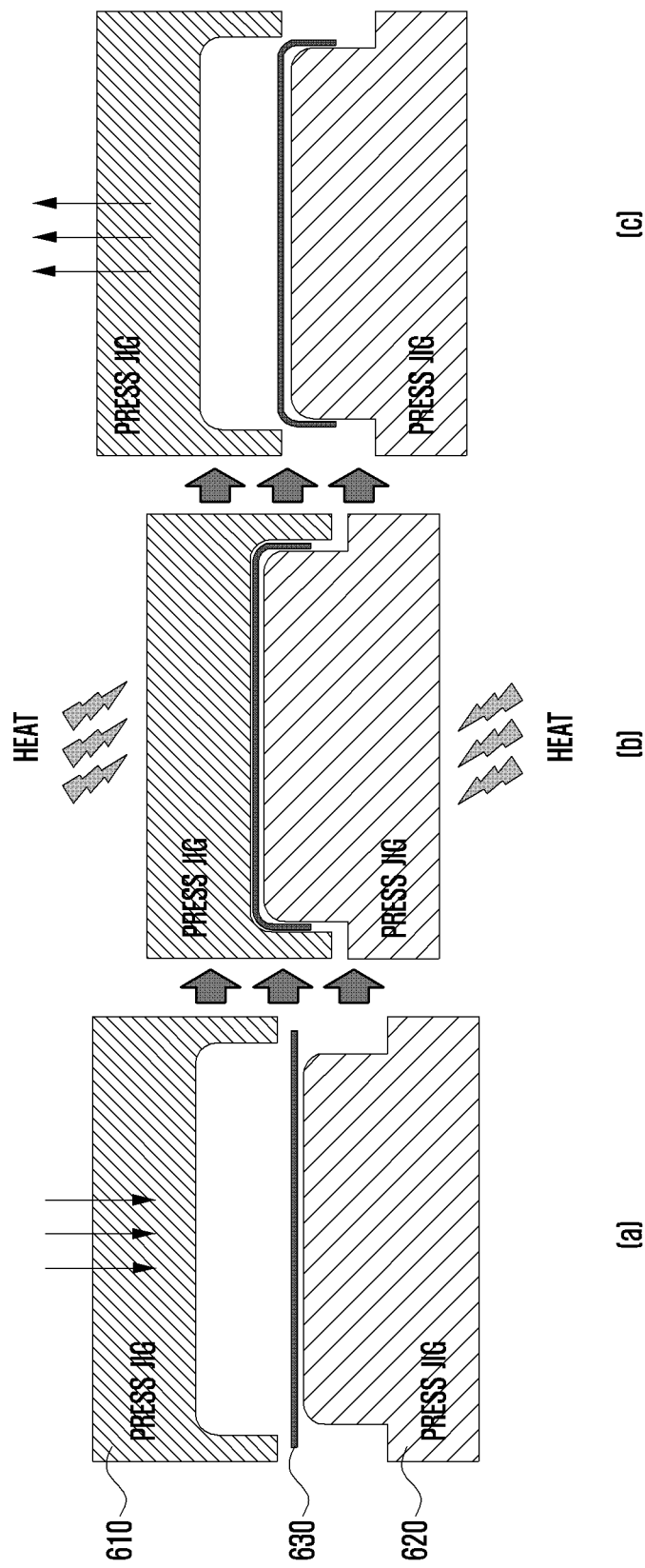
FIG. 6 illustrates a thermoforming process that shapes a flat film into a three-dimensional film according to various embodiments of the present disclosure.

FIG. 6 illustrates a thermoforming process that shapes a flat film into a three-dimensional film according to various embodiments.

When the flat film is directly laminated on the transparent window having a double curvature surface, there may be a problem that a part of the flat film is lifted or bubbles are generated. Hence, the flat film needs to be shaped into a three-dimensional film corresponding to the shape of the transparent window having a double curvature surface. A thermoforming or vacuum forming technique can be used to shape a flat film into a three-dimensional film. Thermoforming is used in FIG. 6.

With reference to FIG. 6, at step (a), a flat film 630 prepared in advance may be located between the upper mold 610 and the lower mold 620. In one embodiment, the flat film 630 may be sufficiently preheated before step (a) so as to prevent ripping and folding due to the compression of the mold. At step (b), the upper mold 610 and the lower mold 620 can be compressed to shape the flat film 630. During this time, sufficient heat can be supplied to allow the flat film 630 to be freely deformed. At step (c), the upper mold 610 and the lower mold 620 may be released for decompression to obtain a film having a fixed three-dimensional shape.

With reference back to FIG. 5, at operation 520, the molded three-dimensional film may be laminated on the transparent window.

Figure 7:
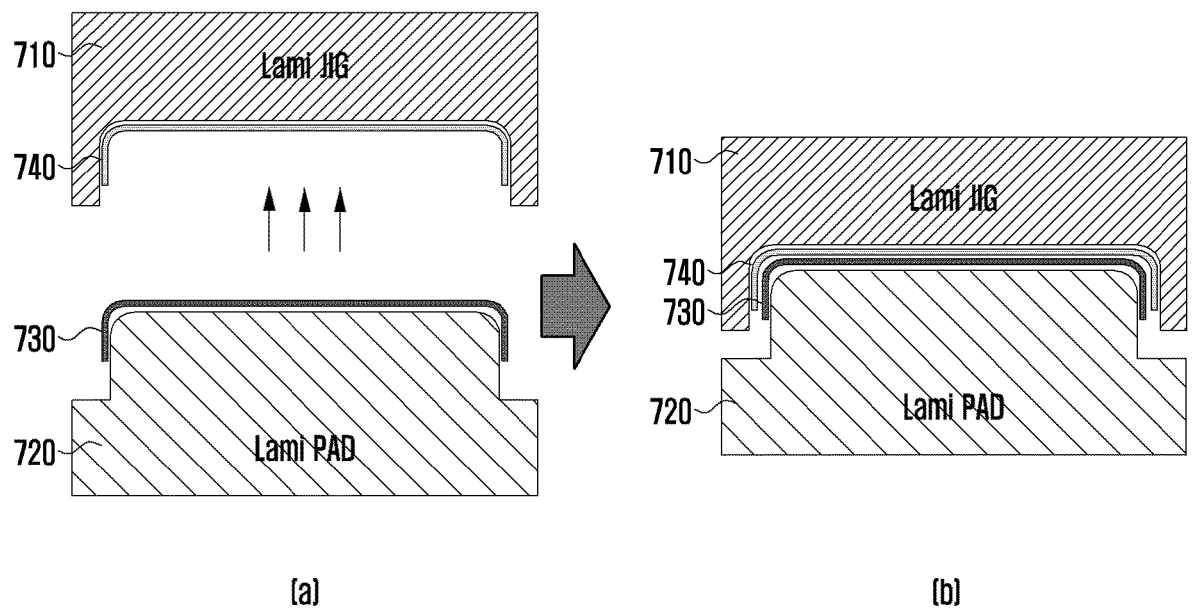
FIG. 7 illustrates a process of laminating a three-dimensional film on a transparent window according to various embodiments of the present disclosure.

FIG. 7 illustrates a process of laminating a three-dimensional film on a transparent window according to various embodiments.

With reference to FIG. 7, at step (a), the transparent window 740 may be positioned at the upper mold 710 and the molded three-dimensional film 730 may be positioned at the lower silicone pad 720. At step (b), the upper mold 710 and the lower silicone pad 720 may be compressed so that the molded three-dimensional film 730 is completely laminated on the transparent window 740. The lower silicone pad 720 fills the empty space when the upper mold 710 is compressed, assisting in complete lamination between the transparent window 740 and the three-dimensional film 730.

With reference back to FIG. 5, at operation 530, the flexible panel may be laminated on the transparent window in which the three-dimensional film is laminated.

Figure 8:
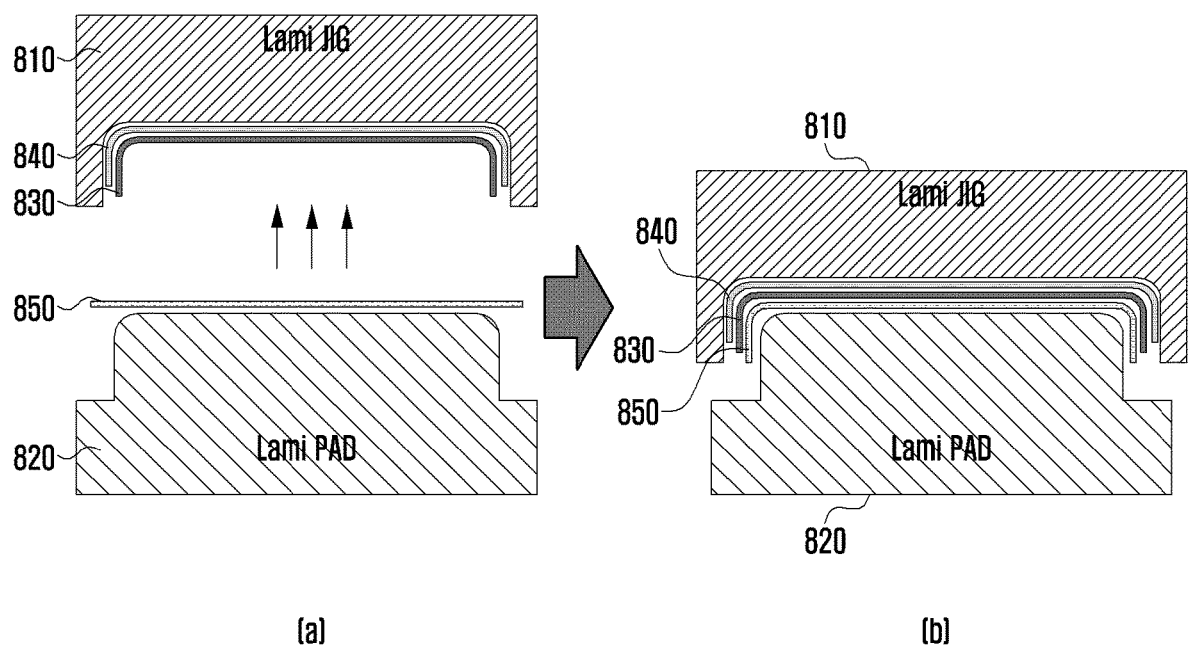
FIG. 8 illustrates a process of laminating a flexible panel on a transparent window on which a three-dimensional film is laminated according to various embodiments of the present disclosure.

FIG. 8 illustrates a process of laminating a flexible panel on a transparent window in which a three-dimensional film is laminated according to various embodiments.

With reference to FIG. 8, at step (a), the transparent window 840 in which the three-dimensional film 830 is laminated may be positioned at the upper mold 810 and the flexible panel 850 may be positioned at the lower silicone pad 820. At step (b), the upper mold 810 and the lower silicone pad 820 may be compressed so that the flexible panel 850 is laminated on the transparent window 840 in which the three-dimensional film 830 is laminated. As in the case of FIG. 7, the lower silicone pad 820 fills the empty space when the upper mold 810 is compressed, assisting in complete lamination between the transparent window 840, the three-dimensional film 830, and the flexible panel 850.

Figure 9:
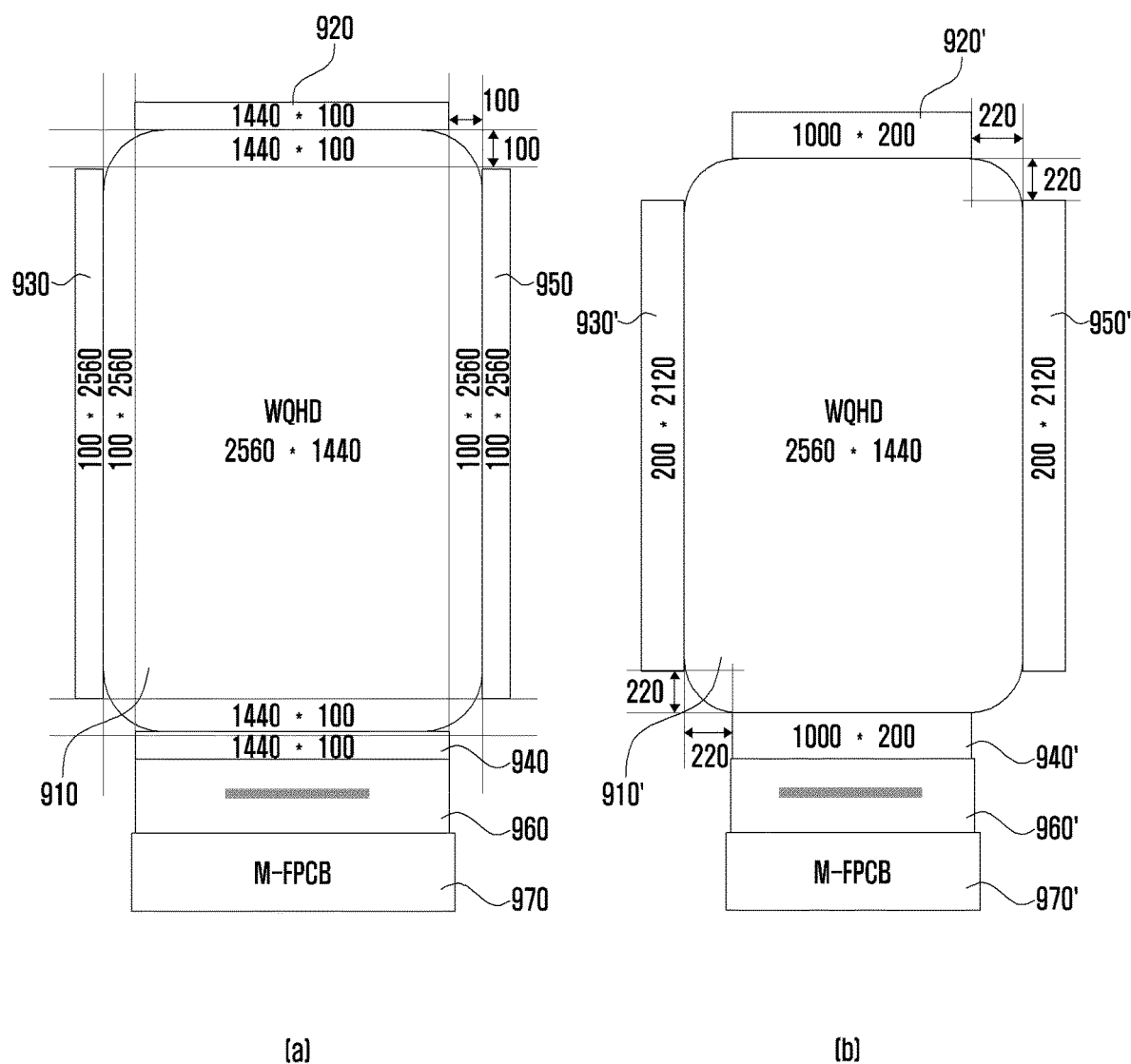
FIG. 9 illustrates a flexible panel in a wide quad high definition (WQHD) environment according to various embodiments of the present disclosure.

FIG. 9 illustrates a flexible panel in a wide quad high definition (WQHD) environment according to various embodiments.

As shown in part (a) of FIG. 9, a flexible panel in the WQHD environment may be fabricated based on the standard resolution (2560*1440). The flexible panel may have a substantially rectangular front display area 910. To manufacture an electronic device having a front display area with curved corners, the front display area 910 having a substantially rectangular shape may be extended by a given length (e.g. 100 pixels) in directions perpendicular to the sides thereof. By processing the adjacent edges of each side extended in the vertical direction in a smoothly curved shape, it is possible to manufacture a flexible panel including the front display area 910 based on the standard resolution (2560*1440). The flexible panel thus manufactured may include at least one side display area extended from each side. For example, the flexible panel may include at least one of the top-side display area 920, the bottom-side display area 940, the left-side display area 930, and the right-side display area 950, which are physically connected to the front display area. The side display areas may be extended by the same length (e.g. 100 pixels), and may be extended by different lengths if necessary.

As shown in part (b) of FIG. 9, to fabricate a flexible panel with curved corners based on the standard resolution (2560*1440) in the WQHD environment, at least a portion of the front display area 910' may be removed. For example, the edges of the substantially rectangular front display area may be processed to have a given curvature, so that some portions of the display area may be removed. The flexible panel may include the front display area 910' and at least two side display areas extended from each side of the front display area 910'. For example, the flexible panel may include at least one of the top-side display area 920', the bottom-side display area 940', the left-side display area 930', and the right-side display area 950', which are physically connected to the front display area. These side display areas are substantially the same as the side display areas described in part (a) of FIG. 9.

The flexible panel shown in part (a) or (b) of FIG. 9 may be driven by one display driver chip (DDI) 970 or 970' through an interface 960 or 960'. For example, the front display area 910 or 910', the top-side display area 920 or 920', the bottom-side display area 940 or 940', the left-side display area 930 or 930', and the right-side display area 950 or 950' may be driven by the same display driver chip so that they display different pieces of content independently. Although not shown, the flexible panel may be driven by at least two display driver chips, and different display areas may be controlled by different display driver chips.

FIGS. 10 to 13 illustrate an electronic device including electronic components according to various embodiments.

Figure 10:
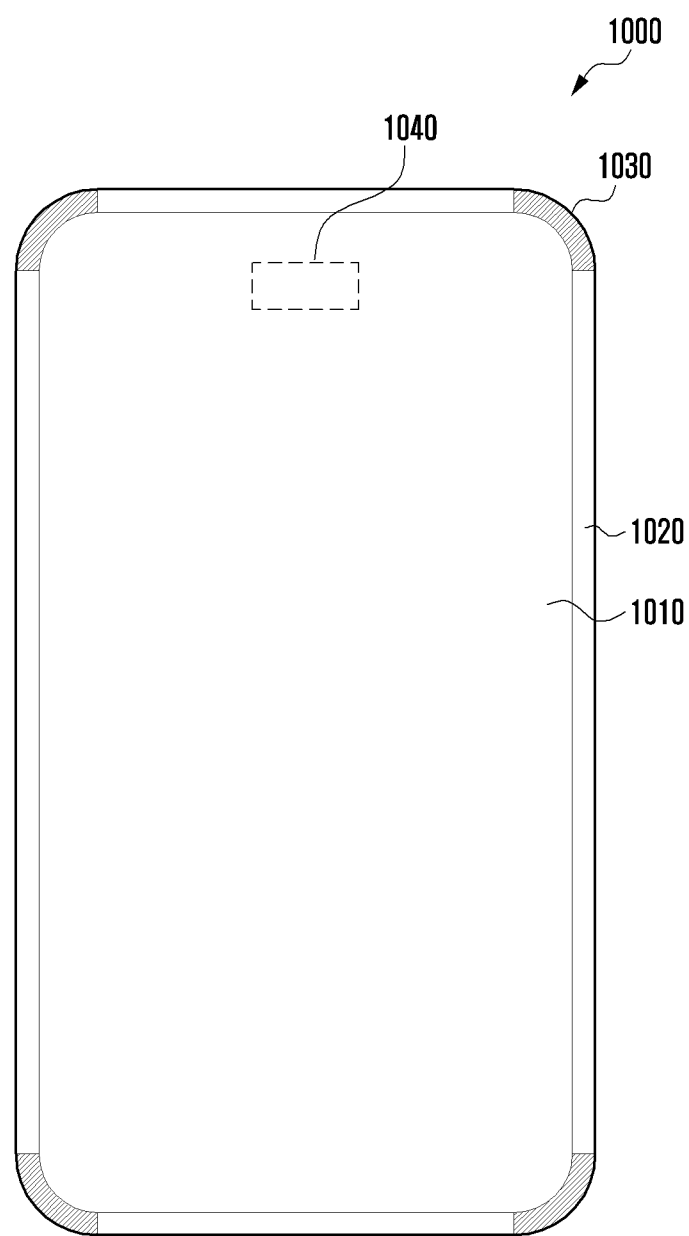
FIGS. 10 to 13 illustrate an electronic device including electronic components according to various embodiments of the present disclosure.

FIG. 10 depicts an electronic device including an electronic component 1040 (e.g. speaker (receiver), microphone, camera, and sensor) without an external interface.

The electronic device 1000 without an external interface may include, for example, a speaker (or receiver) and/or a microphone including a piezo element (piezoelectric element). A piezo element is an element that uses piezoelectric phenomena to convert electric vibrations into sound waves. The speaker and microphone including a piezo element may receive a sound signal from the outside of the electronic device 1000 and output a sound signal to the outside without use of an external interface.

The electronic device 1000 without an external interface may include a camera and/or a sensor that may receive light from the outside through a portion of, for example, the front display area 1010. Specifically, the camera and/or the sensor disposed adjacent to the display area can receive light from the outside through the display. For example, in the case of a transparent display, the transparent display may receive light from the outside. In the case of an opaque display, the pixel structure of the flexible panel and/or the structure of the touch panel may be changed so that the opaque display can receive light from the outside. As another example, a camera and/or a sensor may be configured to be directly included in the flexible panel (referred to as a panel-embedded camera). The panel-embedded camera may be formed by including image sensor pixels in at least a portion of the flexible panel. The panel-embedded camera may be configured to receive light from the outside of the electronic device 1000. These techniques are well known to those skilled in the art, and a detailed description thereof will be omitted.

Figure 11:
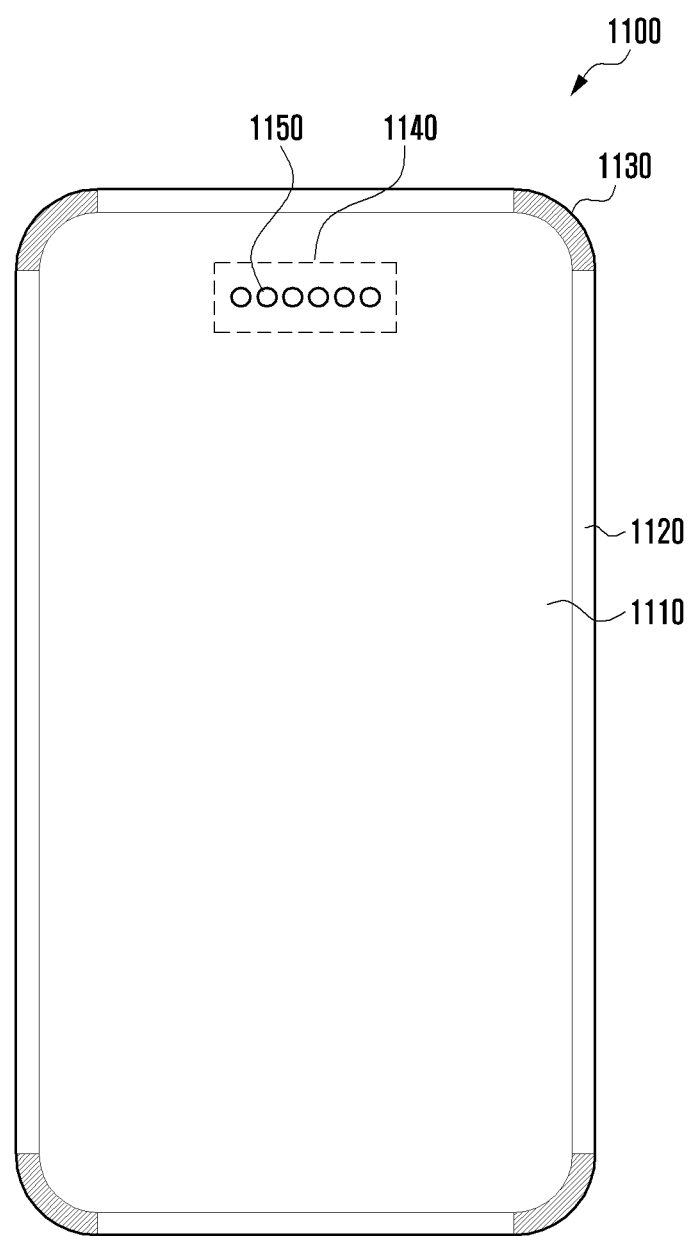

As shown in FIG. 11, the display of an electronic device 1100 may include a plurality of fine holes 1150, and the electronic device 1100 may include an electronic component 1140 (e.g. speaker (receiver), microphone, camera, or sensor) at a position corresponding to the fine holes 1150. The display including the fine holes 1150 at a position corresponding to the electronic component 1140 may utilize the fine holes 1150 as an external interface. Here, a fine hole may refer to a small hole with a diameter of 0.1 mm or less. As the size of a fine hole is smaller, the portion where fine holes are formed is recognized as similar to the portion where fine holes are not formed, so that the whole design can provide a sense of unity. That is, when a plurality of fine holes 1150 are formed in a region corresponding to electronic components 1140 (e.g. speaker (receiver), microphone, camera, and sensor), the electronic components 1140 may input and output a sound signal from and to the outside and receive light from the outside through the fine holes 1150. The fine holes 1150 can serve as an interface for connecting the inside and the outside of the electronic device 1100.

Figure 12:
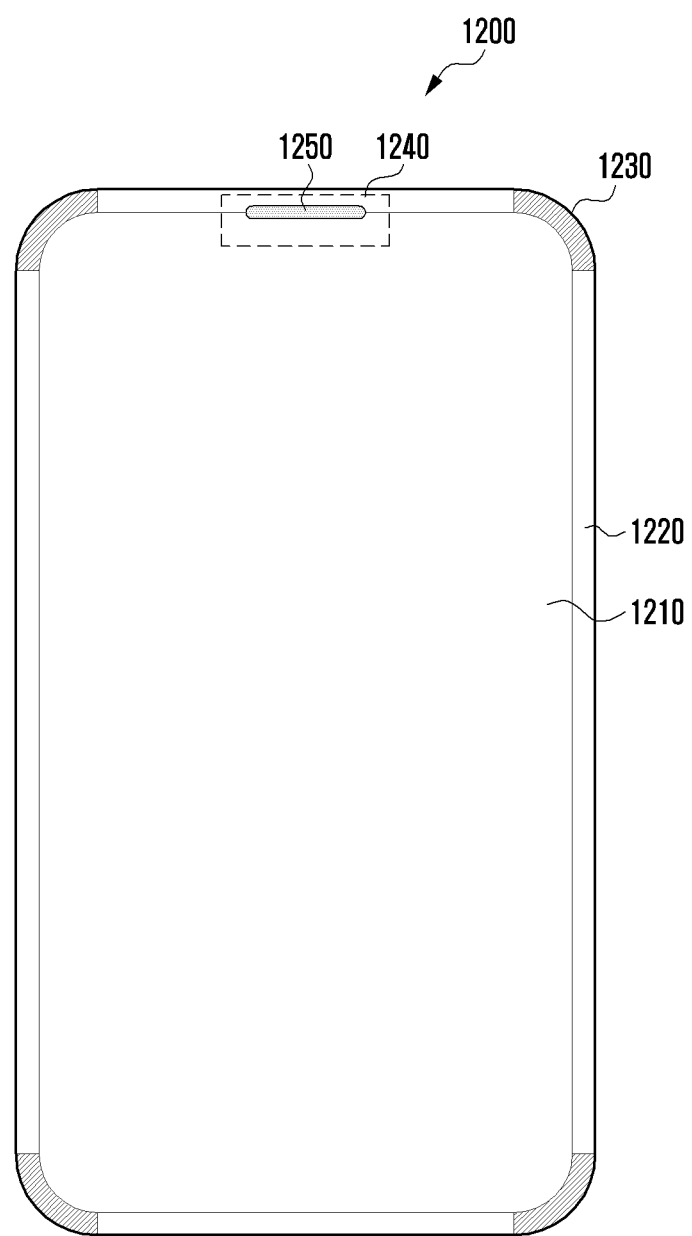

As shown in FIG. 12, at least one display area of an electronic device 1200 may be connected with at least another display area so that a physically separate space 1250 is included there between. For example, the side display area 1220 physically connected with the front display area 1210 may include the physically separate space 1250. The physically separate space 1250 can serve as an interface for connecting the inside and the outside of the electronic device 1200. That is, when an electronic component 1240 (e.g. speaker, camera, or sensor) is disposed close to the physically separate space 1250, the electronic component 1240 may output a sound signal to the outside or receive light from the outside through the physically separate space 1250. Hence, the speaker and/or the camera may operate smoothly.

Figure 13:
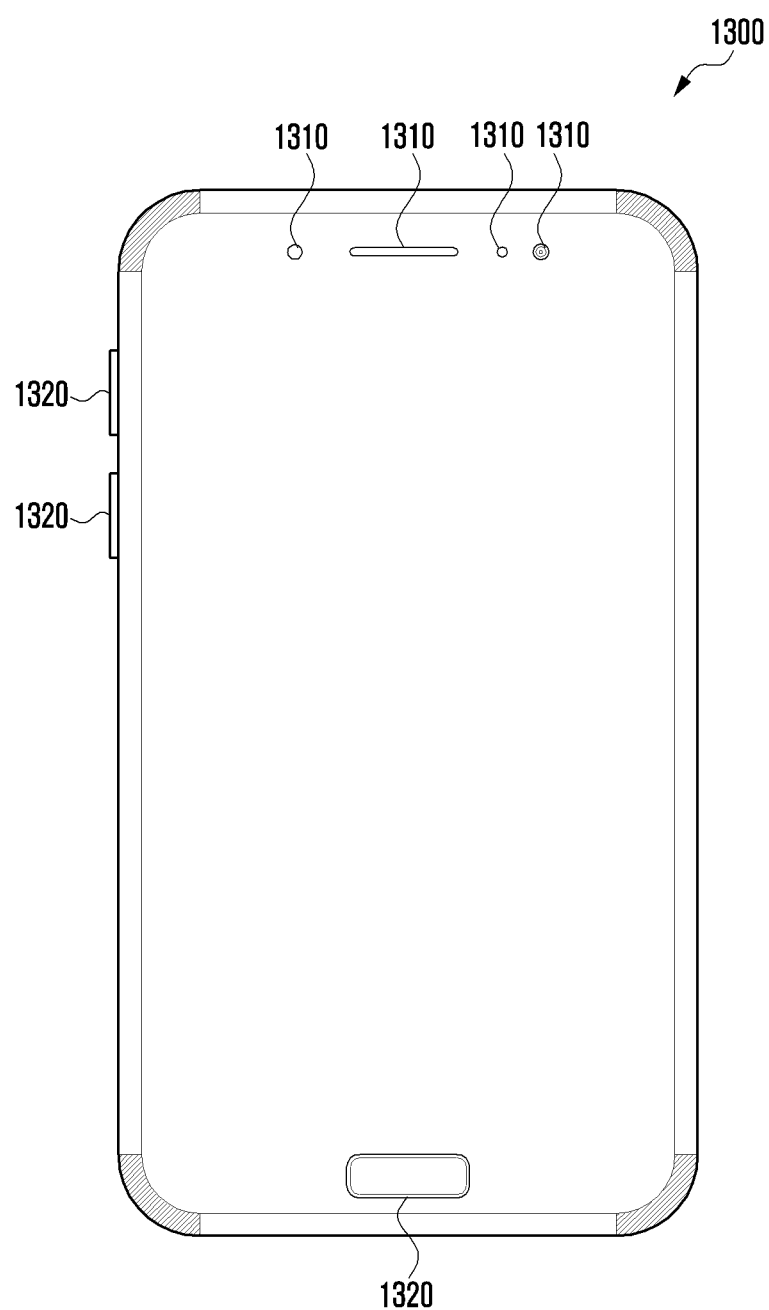

FIG. 13 shows a display area including an external interface 1310. The external interface 1310 may be an external path of an electronic component (e.g. speaker (receiver), microphone, camera, or sensor) included in the electronic device, or a path for connecting to an external device. The external interface 1310 may include, for example, a USB terminal, a microphone hole, a speaker hole, or an earphone interface. The display area may further include a key button 1320. To accommodate the external interface 1310 or the key button 1320, at least a portion of the display area may be cut.

As shown in FIGS. 11 to 13, the display area including an external interface needs to be cut. For example, the display process may further include a step of cutting for the external interface after the steps shown in FIG. 5. Specifically, after the flexible panel is laminated on the transparent window in which the three-dimensional film is laminated, a step of forming fine holes or a step of cutting at least a portion between physically connected display areas may be included in addition. This cut portion may be used as an external passage for an electronic component, as a passage for connecting to an external device, and as a region where a button key is to be mounted.

The methods described in FIGS. 10 to 13 may be applied in an individual and selective manner, but the methods may also be applied in an overlapping and simultaneous manner. They may be applied in various ways in consideration of the aesthetics of the electronic device and the performance of electronic components.

According to various embodiments, an electronic device may include: a front display area; at least two separate side display areas that are physically connected with at least one side of the front display area and form a convex curved surface in at least one space between the front and the rear of the electronic device; and a non-display area that physically connects at least two side display areas of the at least two separate side display areas and forms a convex double curvature surface in at least another space between the front and the rear of the electronic device, wherein the at least two physically connected side display areas are bent in directions so that an acute angle, a right angle or an obtuse angle is formed.

In one embodiment, the at least two separate side display areas may each include side display areas curved in opposite directions and side display areas curved in directions perpendicular to each other.

In one embodiment, at least one display area among the front display area and the at least two separate side display areas may include an external interface.

In one embodiment, the external interface may include at least one of a USB terminal, a microphone hole, a speaker hole, a key button, and an earphone interface.

In one embodiment, the front display area may include a plurality of fine holes in at least one space.

In one embodiment, the electronic device may include at least one of a speaker, a microphone, a camera, and a sensor at a position corresponding to the fine holes.

In one embodiment, the front display area may be connected with one of the at least two separate side display areas so that a physically separate space is included there between.

In one embodiment, the electronic device may include at least one of a speaker, a microphone, a camera, and a sensor at a position corresponding to the physically separate space.

According to various embodiments, an electronic device may include: a display; and at least one display driver chip (DDI) to drive the display, wherein the display may include a transparent window enclosing the front and at least a portion of the lateral side of the electronic device, a three-dimensional film having a shape corresponding to the shape of the transparent window, and a flexible panel including a front display area and at least two separate side display areas, and wherein at least two side display areas among the at least two separate side display areas are bent in directions so that an acute angle, a right angle or an obtuse angle is formed.

In one embodiment, the three-dimensional film may be divided into a region corresponding to a display area and a region corresponding to a non-display area and the regions are marked so that they can be visually distinguished from each other.

In one embodiment, the region of the three-dimensional film corresponding to a display area may be transparent, and the region corresponding to a non-display area may be at least opaque.

In one embodiment, the electronic device may further include at least one of a speaker, a microphone, a camera, and a sensor.

In one embodiment, the speaker or the microphone may include a piezo element that converts electric vibrations into sound waves.

In one embodiment, the camera may be included in the flexible panel.

In one embodiment, the display may include a plurality of fine holes in at least one region, and at least one of the speaker, the microphone, the camera, and the sensor may be disposed close to a position corresponding to the fine holes.

In one embodiment, the display may include a physically separate space between the front display area and one of the at least two separate side display areas, and at least one of the speaker, the microphone, the camera, and the sensor may be disposed close to a position corresponding to the physically separate space.

Figure 14:
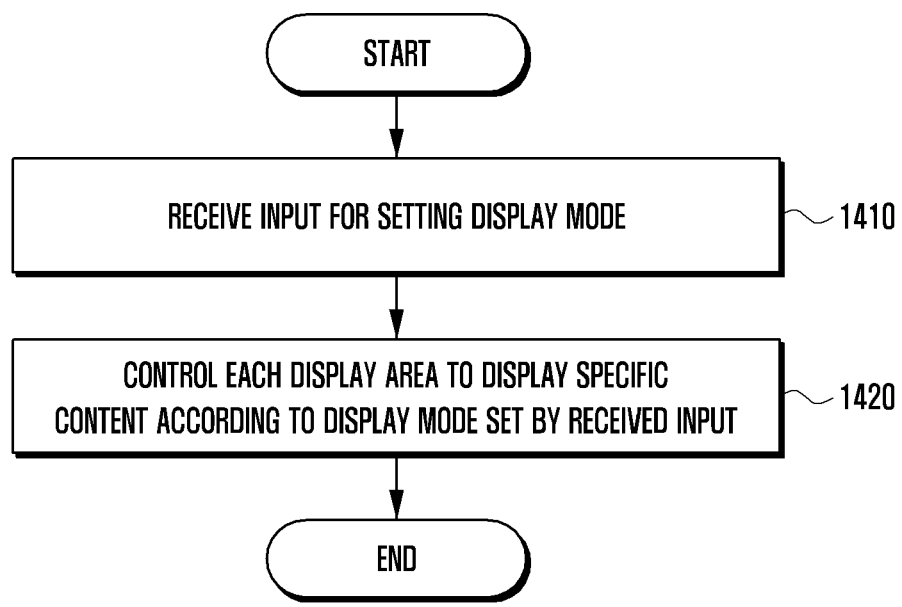
FIG. 14 illustrates a flowchart of a method for controlling display areas of the electronic device according to various embodiments of the present disclosure.

FIG. 14 is a flowchart of a method for controlling display areas of the electronic device according to various embodiments.

The electronic device including a front display area and at least two separate side display areas may separately control and operate the individual display areas to display different screens. For example, while the front display area displays specific content, at least one side display area may display an icon capable of executing an application. At the same time, another at least one side display area may display a control button for controlling the content displayed in the front display area. At the same time, another at least one side display area may display a toolbar for a particular situation. At the same time, another at least one side display area may display a notification for a received message, call or latest news.

With reference to FIG. 14, at operation 1410, the electronic device may receive an input for setting the display mode.

The input for setting the display mode can be received in various ways. For example, an input may be received from the user to set the display mode. An input for setting the display mode may be received based on the state of the electronic device. For example, the state of the electronic device may be identified based on a gyro sensor included in the electronic device, and an input may be automatically generated to set the display mode appropriate for the identified state. In addition, an input for setting the display mode may be received when a specific event occurs. At operation 1420, based on the received input, the electronic device may control each display area to display specific content according to the display mode.

In various embodiments, the electronic device may have a substantially rectangular front display area. For example, the length of the left side and the right side of the front display area may be larger than the length of the upper side and the lower side. Hence, content may be displayed in various ways according to the display mode by using the rectangular front display area and the at least two separate side display areas. For example, the display mode may include at least one of horizontal display mode, vertical display mode, full horizontal display mode, full vertical display mode, and stereoscopic effect mode.

Figure 15:
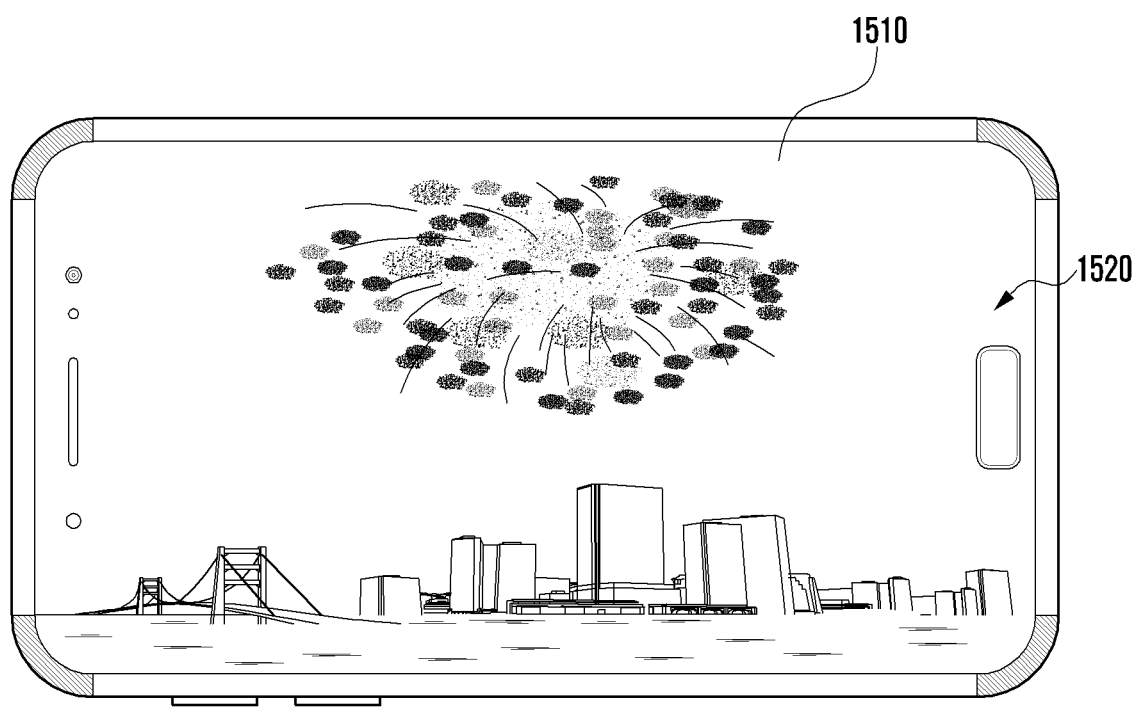
FIGS. 15 to 20 illustrate display modes according to various embodiments of the present disclosure.

FIG. 15 illustrates the horizontal display mode according to various embodiments. For an electronic device having a rectangular front display area 1510, in the horizontal display mode, the content 1520 is displayed on the screen so that the long sides among the sides of the front display area 1510 are parallel to the horizontal direction of the screen. For example, in the horizontal display mode, when the front display area 1510 has a resolution of 1440*2560, the content may be displayed using 2560 pixels in the horizontal direction and 1440 pixels in the vertical direction.

Figure 16:
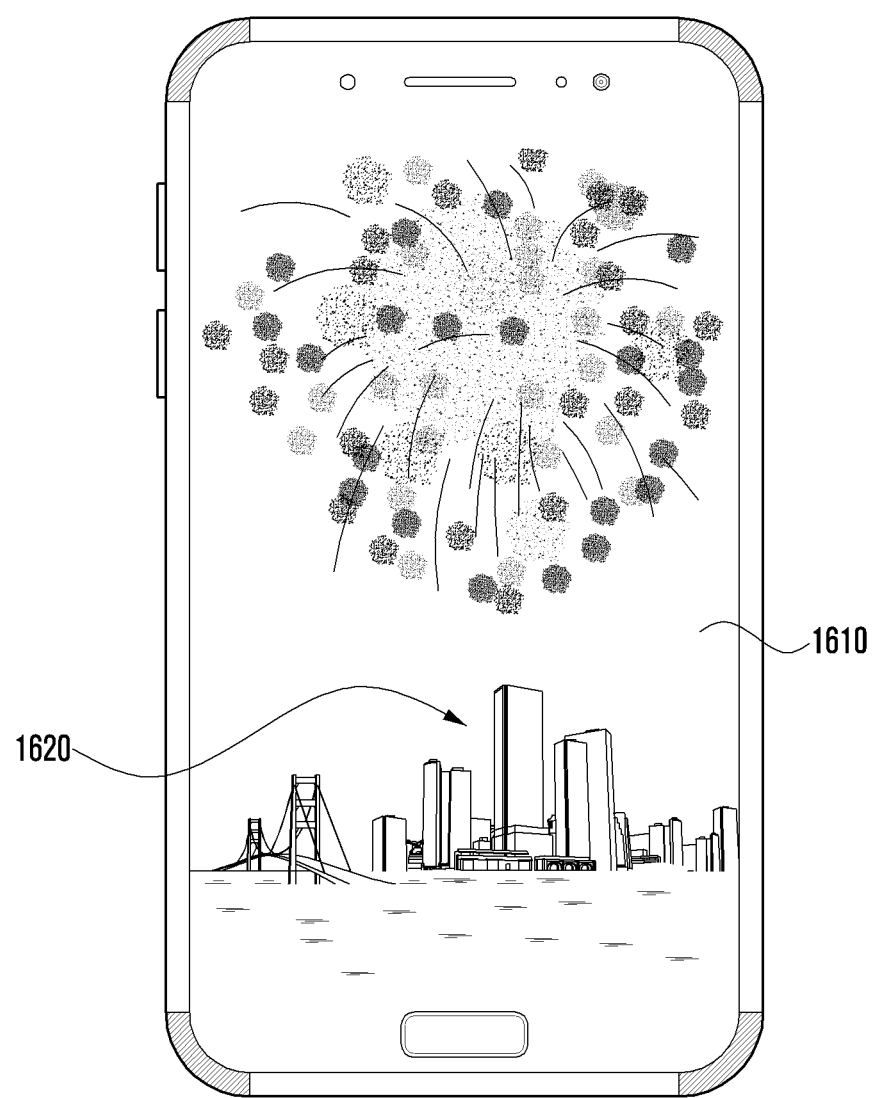

FIG. 16 illustrates the vertical display mode according to various embodiments. For an electronic device having a rectangular front display area 1610, in the vertical display mode, the content 1620 is displayed on the screen so that the long sides among the sides of the front display area 1610 are parallel to the vertical direction of the screen. For example, in the vertical display mode, when the front display area 1610 has a resolution of 1440*2560, the content may be displayed using 1440 pixels in the horizontal direction and 2560 pixels in the vertical direction.

In various embodiments, the electronic device may utilize the front display area and at least one of the side display areas physically connected with the front display area as a single display area. For example, in the horizontal display mode or vertical display mode, content may be displayed in an expanded display area obtained by extending the front display area by at least one side display area physically connected with the front display area.

Figure 17:
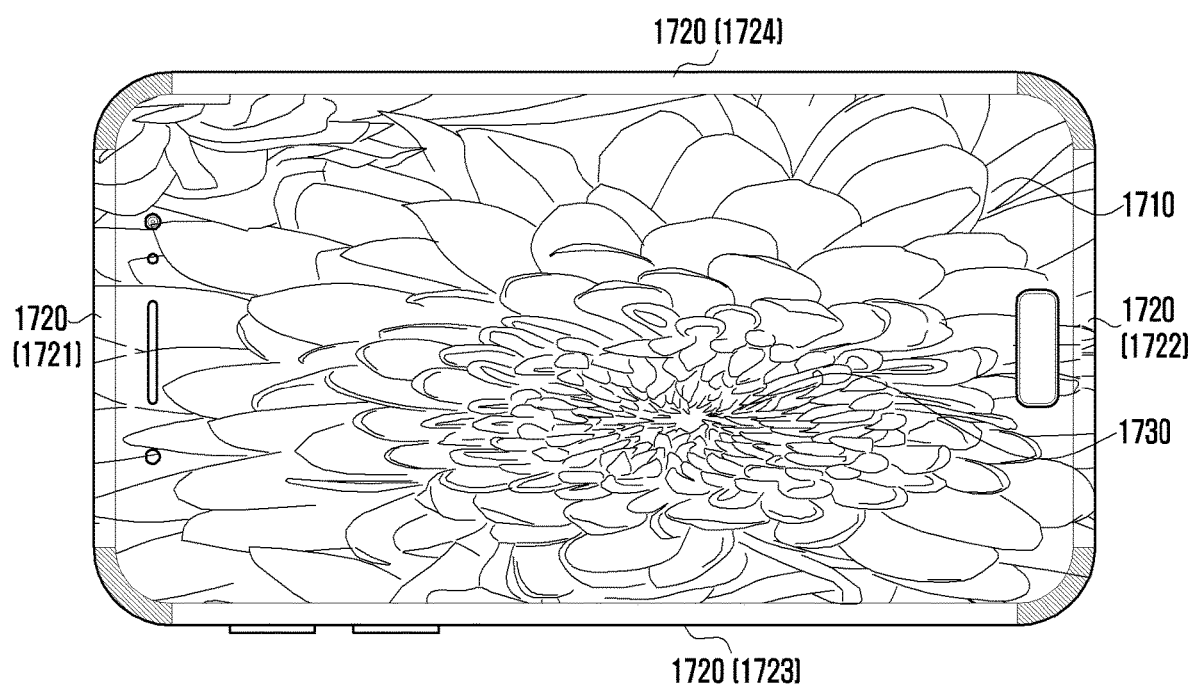

FIG. 17 illustrates the full horizontal display mode according to various embodiments. In the full horizontal display mode, the front display area 1710 and at least one side display area 1720 are used as a single display area on the basis of the horizontal display mode.

With reference to FIG. 17, the electronic device including a front display area 1710 having a resolution of 1440*2560 may further include at least one side display area 1720 having a resolution of 1440*200 extended toward the top side 1721 or the bottom side 1722. Upon receiving an input for setting the full horizontal display mode, the electronic device may display the content 1730, which has been displayed in the front display area 1710 according to the horizontal display mode, in both the front display area 1710 and the at least one side display area 1720. For example, upon receiving an input for setting the full horizontal display mode, the same content may be displayed by using the front display area 1710, the top-side display area 1721, and the bottom-side display area 1722 as a single display area. For example, for the electronic device having the above resolution, one piece of content can be displayed in one display area being 2960 pixels wide and 1440 pixels high. In another embodiment, upon receiving an input for setting the full horizontal display mode, the electronic device may display the content, which has been displayed in the front display area according to the horizontal display mode, in both the front display area 1710 and the side display area (e.g. left-side display area 1723 or right-side display area 1724) extended toward the left and right of the electronic device.

Figure 18:
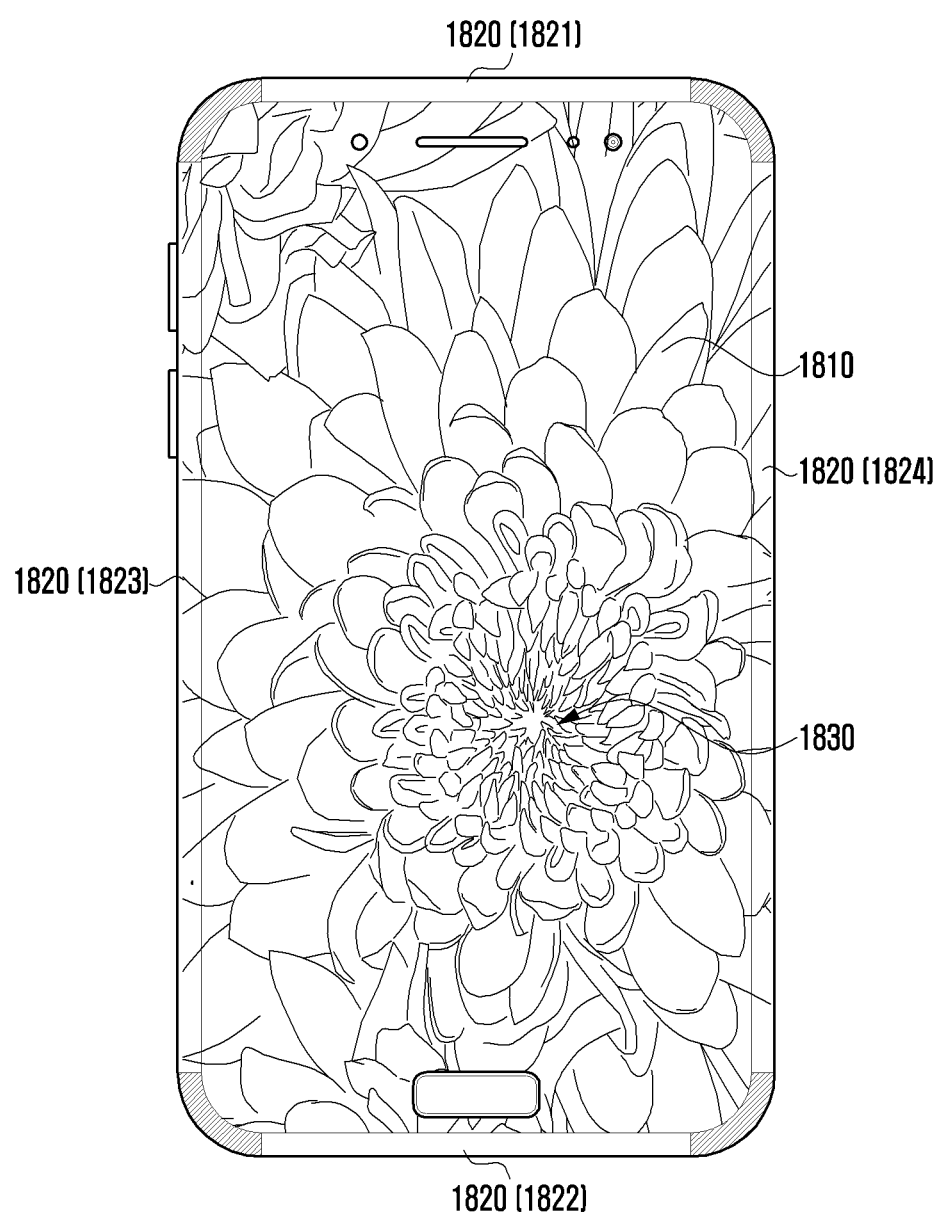

FIG. 18 illustrates the full vertical display mode according to various embodiments. In the full vertical display mode, the front display area 1810 and at least one side display area 1820 are used as a single display area on the basis of the vertical display mode.

With reference to FIG. 18, the electronic device including a front display area 1810 having a resolution of 1440*2560 may further include at least one side display area 1820 having a resolution of 200*2560 extended toward the left side 1823 or the right side 1824. Upon receiving an input for setting the full vertical display mode, the electronic device may display the content 1830, which has been displayed in the front display area 1810 according to the vertical display mode, in both the front display area 1810 and the at least one side display area 1820. For example, for the electronic device having the above resolution, one piece of content can be displayed in one display area being 1840 pixels wide and 2560 pixels high. In another embodiment, upon receiving an input for setting the full vertical display mode, the electronic device may display the content, which has been displayed in the front display area according to the vertical display mode, in both the front display area and the side display area (e.g.

top-side display area 1821 or right-side display area 1822) extended toward the top and bottom of the electronic device.

Figure 19:
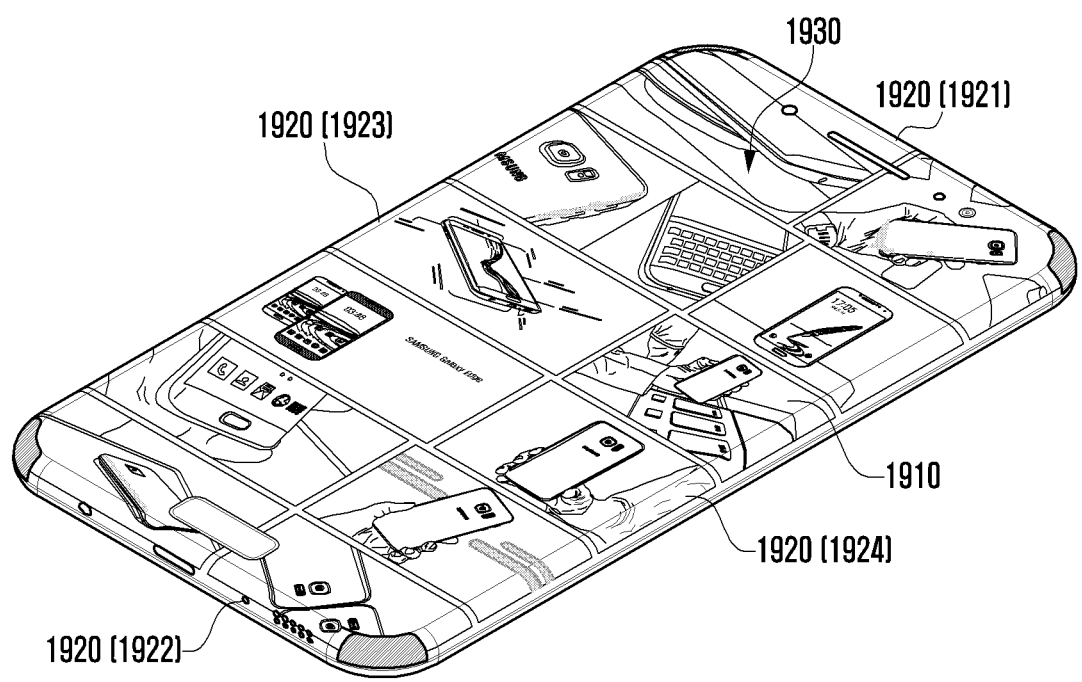

FIG. 19 illustrates the full display mode according to various embodiments. In the full display mode, the front display area 1910 and all the side display areas 1920 are used as a single display area.

In FIG. 19, for the full display mode, the electronic device may display the content 1930, which has been displayed in the front display area 1910, in both the front display area 1910 and all the side display areas 1920. The full display mode can be used to give various effects to the displayed content 1930. For example, when the content 1930 includes an object, the object may be displayed in the front display area 1910 and the shadow of the object may be displayed in the side display areas 1920, thereby giving a feeling of liveliness to the object. In another embodiment, the side display areas 1920 can be used to represent the stereoscopic effect or texture of an object.

Figure 20:
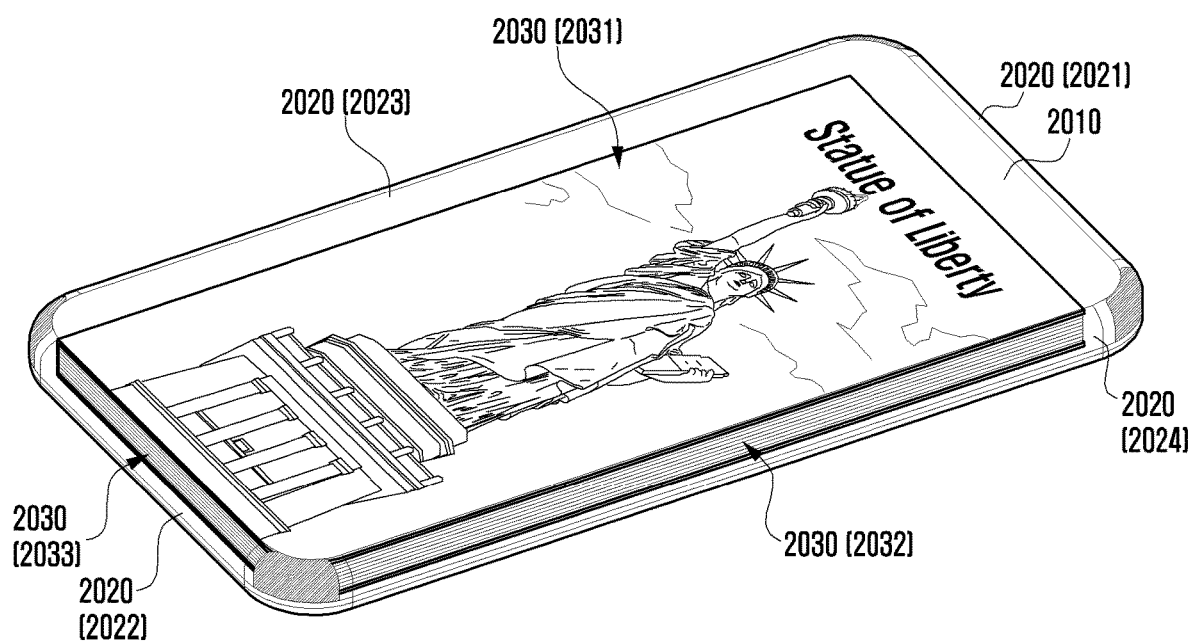

FIG. 20 illustrates the stereoscopic effect mode according to various embodiments. In the stereoscopic effect mode, an object contained in the content may be displayed three-dimensionally based on, for example, the full display mode.

As shown in FIG. 20, the side display areas 2020 can be used to represent a three-dimensional effect of the object 2030. For example, when the front display area 2010 displays the object 2030 (e.g. front 2031 of the object), the side display area 2020 may display a side portion corresponding to the object 2030 (e.g. side 2023 or 2032 of the object), representing a three-dimensional effect. In this way, a sense of depth, thickness, or texture of the object 2030 can be represented. For example, the side display areas 2020 may be used to represent the texture of an object such as a tree, glass or stone, and a sense of thickness of an object such as paper or a book.

In various embodiments, when an object is displayed in the front display area, to display the side portion corresponding to the object in the side display area, the electronic device may pre-store 3D data for the object or predict the side portion of the object. Specifically, the electronic device can identify the displayed object (e.g. type, species or gender), retrieve the general shape for the identified object from a database, and display the general shape in the side display areas. For example, when an object displayed in the front display area is identified as a male person, the electronic device may apply a general shape of a male person to the object being displayed and control the side display areas to display the side portion of the object, thereby giving a three-dimensional feeling.

According to various embodiments, a method for an electronic device including a front display area and at least two separate side display areas to control the display areas may include: receiving an input for setting the display mode; and controlling each display area to display specific content according to the display mode indicated by the received input.

In one embodiment, when the received input sets the full vertical display mode, one piece of content is displayed in both the front display area and at least one side display area, and the content is arranged on the screen so that the long sides among the sides of the front display area are parallel to the vertical direction of the screen displaying the content.

In one embodiment, when the received input sets the full horizontal display mode, one piece of content is displayed in both the front display area and at least one side display area, and the content is arranged on the screen so that the long sides among the sides of the front display area are parallel to the horizontal direction of the screen displaying the content.

In one embodiment, when the received input sets the stereoscopic effect mode, the front display area is used to display a piece of content containing an object and the at least two separate side display areas are used to display a side portion corresponding to the object displayed in the front display area.

At least part of the method (e.g., operations) or devices (e.g., modules or functions) according to various embodiments may be implemented with instructions that can be conducted via various types of computers and stored in computer-readable storage media, as types of programming modules, for example. One or more processors (e.g., processor 120) can execute command instructions, thereby performing the functions. An example of the computer-readable storage media may be memory 130.

Examples of computer-readable media include: magnetic media, such as hard disks, floppy disks, and magnetic media (e.g., magnetic tape); optical media such as Compact Disc Read Only Memory (CD-ROM) disks and Digital Versatile Disc (DVD); magneto-optical media, such as floptical disks; and hardware devices such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules to perform the operations of various embodiments described above, or vice versa.

Modules or programming modules according to various embodiments may include one or more components, remove part of them described above, or further include new components. The operations performed by modules, programming modules, or other components, according to various embodiments, may be executed in serial, parallel, repetitive or heuristic fashion. Part of the operations can be executed in any other order, skipped, or executed with additional operations.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. An electronic device comprising:
   a display including:
      a transparent window enclosing a front and at least a portion of a lateral side of the electronic device;
      a three-dimensional film of a shape corresponding to the shape of the transparent window; and
      a flexible panel, the flexible panel including:
         a front display area;
         four side display areas that are physically extended from the front display area, each side display area forming a convex curved side surface of the electronic device; and
         four corner non-display areas, each corner non-display area physically connecting adjacent two side display areas among the four side display areas and forming a convex double curvature corner surface disposed entirely within a space extending partially between the front and a rear of the electronic device, wherein the three-dimensional film is laminated on the transparent window and the flexible panel is laminated on the transparent window, such that the three-dimensional film is disposed between the transparent window and the flexible panel, wherein each of the corner non-display areas comprises a portion that extends to a curved corner portion of the front display area, wherein each of the corner non-display areas comprises an opaque mechanism, wherein the adjacent two side display areas are bent in directions and form at least one of an acute angle, a right angle or an obtuse angle, and wherein the front display area is connected with one of the four side display areas and a physically separate space separate from the four corner non-display areas is included therebetween, wherein at least one of a speaker, a microphone, a camera, and a sensor is disposed at a position corresponding to the physically separate space.

2. The electronic device of claim 1, wherein the four side display areas include side display areas bent in opposite directions and side display areas bent in directions perpendicular to each other.

3. The electronic device of claim 1, wherein at least one display area among the front display area and the four side display areas includes an external interface.

4. The electronic device of claim 3, wherein the external interface includes at least one of a USB terminal, a microphone hole, a speaker hole, a key button, and an earphone interface.

5. The electronic device of claim 1, wherein the front display area includes a plurality of fine holes in at least one space.

6. The electronic device of claim 5, wherein the electronic device comprises at least one of the speaker, the microphone, the camera, and the sensor at a position corresponding to the fine holes.

7. An electronic device comprising:
a display; and
at least one display driver chip (DDI) to drive the display,
wherein the display includes a transparent window enclosing a front and at least a portion of a lateral side of the electronic device, a three-dimensional film of a shape corresponding to the shape of the transparent window, and a flexible panel including a front display area, four side display areas and four corner non-display areas, wherein the three-dimensional film is laminated on the transparent window and the flexible panel is laminated on the transparent window, such that the three-dimensional film is disposed between the transparent window and the flexible panel,
wherein the four side display areas are physically extended from the front display area, each side display area forming a convex curved side surface of the electronic device, wherein each of the corner non-display areas physically connects adjacent two side display areas among the four side display areas and forms a convex double curvature corner surface disposed entirely within a space extending partially between the front and a rear of the electronic device,
wherein each of the corner non-display areas comprises a portion that extends to a curved corner portion of the front display area, wherein each of the corner non-display areas comprises an opaque mechanism, wherein the adjacent two side display areas among the four side display areas are bent in directions and form at least one of an acute angle, a right angle or an obtuse angle, and wherein the front display area is connected with one of the four side display areas and a physically separate space separate from the four corner non-display areas is included therebetween, wherein at least one of a speaker, a microphone, a camera, and a sensor is disposed at a position corresponding to the physically separate space.

8. The electronic device of claim 7, wherein the three-dimensional film includes a region corresponding to a display area and a region corresponding to a non-display area and the regions are marked to be visually distinguished from each other.

9. The electronic device of claim 8,
wherein the region of the three-dimensional film corresponding to a display area is transparent, and the region corresponding to a non-display area is at least opaque.

10. The electronic device of claim 6, wherein the speaker or the microphone includes a piezo element that converts electric vibrations into sound waves.

11. The electronic device of claim 6, wherein the camera is included in the flexible panel.

12. The electronic device of claim 6, wherein the display includes a plurality of fine holes in at least one region, and wherein at least one of the speaker, the microphone, the camera, and the sensor is disposed close to a position corresponding to the fine holes.

13. A method for an electronic device including a display including a transparent window enclosing a front and at least a portion of a lateral side of the electronic device, a three-dimensional film of a shape corresponding to the shape of the transparent window, and a flexible panel, the flexible panel including a front display area, four side display areas, and four corner non-display areas to control the front display area and the four side display areas, the method comprising:
receiving an input for setting a display mode; and
controlling each display area to display specific content according to the display mode set by the received input,
wherein one display mode includes a stereoscopic effect mode, the stereoscopic effect mode including three-dimensionally displaying an object by displaying on the front display area a piece of content containing the object, and displaying, on the four side display areas, side portions of the object displayed in the front display area to create a representation of at least one of a depth, a thickness, or a texture of the object,
wherein the three-dimensional film is laminated on the transparent window and the flexible panel is laminated on the transparent window, such that the three-dimensional film is disposed between the transparent window and the flexible panel,
wherein the four side display areas are physically extended from the front display area, each side display area forming a convex curved side surface of the electronic device, wherein each of the corner non-display areas physically connects adjacent two side display areas among the four side display areas and forms a convex double curvature corner surface disposed entirely within a space extending partially between the front and a rear of the electronic device, wherein each of the corner non-display areas comprises a portion that extends to a curved corner portion of the front display area, wherein each of the corner non-display areas comprises an opaque mechanism, and wherein the front display area is connected with one of the four side display areas and a physically separate space separate from the four corner non-display areas is included therebetween, wherein at least one of a speaker, a microphone, a camera, and a sensor is disposed at a position corresponding to the physically separate space.

14. The method of claim 13, further comprises:
when the received input sets a full vertical display mode, displaying one piece of content in both the front display area and at least one of the side display areas, and arranging the content on each of the front display area and the at least one of the side display areas where long sides among sides of the front display area are parallel to a vertical direction of each of the front display area and the at least one of the side display areas displaying the content.

15. The method of claim 13, further comprises:
when the received input sets a full horizontal display mode, displaying one piece of content in both the front display area and at least one of the side display areas, and arranging the content on each of the front display area and the at least one of the side display areas where long sides among sides of the front display area are parallel to a horizontal direction of each of the front display area and the at least one of the side display areas displaying the content.

16. The method of claim 13, further comprising:
pre-storing, by the electronic device, three-dimensional data for the object and
when the received input sets the stereoscopic effect mode, predicting, using the pre-stored three-dimensional data for the object, the side portions of the object to be displayed on the four side display areas.

\* \* \* \* \*